United States Patent
Stormberg et al.

(10) Patent No.: US 9,733,414 B2
(45) Date of Patent: Aug. 15, 2017

(54) ILLUMINATION SYSTEM BASED ON ACTIVE AND PASSIVE ILLUMINATION DEVICES

(71) Applicant: Quarkstar LLC, Las Vegas, NV (US)

(72) Inventors: Hans Peter Stormberg, Stolberg (DE); Louis Lerman, Las Vegas, NV (US); Robert C. Gardner, Atherton, CA (US); Ingo Speier, Saanichton (CA); Allan Brent York, Langley (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 14/766,644

(22) PCT Filed: Feb. 7, 2014

(86) PCT No.: PCT/US2014/015255
§ 371 (c)(1),
(2) Date: Aug. 7, 2015

(87) PCT Pub. No.: WO2014/124229
PCT Pub. Date: Aug. 14, 2014

(65) Prior Publication Data
US 2015/0378088 A1 Dec. 31, 2015

Related U.S. Application Data

(60) Provisional application No. 61/762,817, filed on Feb. 8, 2013.

(51) Int. Cl.
*F21V 7/04* (2006.01)
*F21V 8/00* (2006.01)
(Continued)

(52) U.S. Cl.
CPC .............. *G02B 6/0055* (2013.01); *F21S 8/06* (2013.01); *F21V 7/0016* (2013.01); *F21V 7/09* (2013.01);
(Continued)

(58) Field of Classification Search
CPC ..... G02B 6/0045; G02B 6/0055; F21S 8/046; F21S 8/06; F21V 7/0016; F21V 7/0025; F21V 7/0083; F21V 7/0091; F21V 7/09
See application file for complete search history.

(56) References Cited

U.S. PATENT DOCUMENTS 2,280,640 A   4/1942   Edward
3,068,956 A   12/1962  Cooley
(Continued)

FOREIGN PATENT DOCUMENTS

WO   WO2011112914 A3   12/2011

OTHER PUBLICATIONS

International Application No. PCT/US2014/015255, Notification of Transmittal of the International Search Report and the Written Opinion of the International Searching Authority, mailed May 19, 2014, 12 pages.

*Primary Examiner* — Alexander Garlen
(74) *Attorney, Agent, or Firm* — Fish & Richardson P.C.

(57) ABSTRACT

Illumination systems are described for illuminating a target area, e.g., a floor of a room, using active illumination devices in optical communication with passive illumination devices. The active and passive illumination devices of the illumination system are configured and arranged relative to each other in a variety of ways so a variety of intensity distributions can be provided by the illumination system. Such illumination system is implemented to provide light for particular lighting applications, including office lighting, garage lighting, or cabinet lighting.

23 Claims, 12 Drawing Sheets

(51) Int. Cl.
  *F21S 8/06* (2006.01)
  *F21V 7/00* (2006.01)
  *F21V 7/09* (2006.01)
  *F21Y 103/10* (2016.01)
  *F21Y 115/10* (2016.01)

(52) U.S. Cl.
  CPC ........ *G02B 6/0045* (2013.01); *F21V 2200/20* (2015.01); *F21Y 2103/10* (2016.08); *F21Y 2115/10* (2016.08)

(56) References Cited

U.S. PATENT DOCUMENTS

| | | |
|---|---|---|
| 3,798,443 A | 3/1974 | Bartenbach |
| 4,186,433 A | 1/1980 | Baldwin |
| 4,261,433 A | 4/1981 | Propst |
| 4,425,603 A | 1/1984 | Courson |
| 4,701,831 A | 10/1987 | Trini |
| 4,760,505 A | 7/1988 | Cole |
| 5,032,959 A | 7/1991 | Brass |
| 5,075,827 A | 12/1991 | Smith |
| 5,243,506 A | 9/1993 | Whitehead |
| 6,234,643 B1 | 5/2001 | Lichon |
| 6,733,154 B1 * | 5/2004 | Dahlen ................ F21V 7/0016 362/217.06 |
| 7,048,416 B2 | 5/2006 | Clark |
| 7,690,808 B2 | 4/2010 | Yoon |
| 8,002,446 B1 | 8/2011 | Plunk |
| 8,047,673 B2 | 11/2011 | Santoro |
| 8,231,242 B2 | 7/2012 | Kotovsky |
| 8,573,823 B2 | 11/2013 | Dau |
| 9,028,120 B2 | 5/2015 | Dau |
| 9,081,125 B2 | 7/2015 | Dau |
| 2004/0213003 A1 | 10/2004 | Lauderdale |
| 2008/0123338 A1 * | 5/2008 | Kokado ................ F21V 7/0008 362/283 |
| 2012/0268931 A1 | 10/2012 | Lerman |
| 2013/0107502 A1 * | 5/2013 | Leadford ................ F21S 8/026 362/150 |

* cited by examiner

ILLUMINATION SYSTEM BASED ON ACTIVE AND PASSIVE ILLUMINATION DEVICES

CROSS-REFERENCE TO RELATED APPLICATIONS

This application is a U.S. National Stage of International Application No. PCT/US2014/015255, filed Feb. 7, 2014, which claims benefit under 35 U.S.C. §119(e)(1) of U.S. Provisional Application No. 61/762,817, filed on Feb. 8, 2013, which are incorporated by reference herein.

TECHNICAL FIELD

The present disclosure relates to illumination systems that use active and passive illumination devices.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and light-emitting diodes (LEDs).

SUMMARY

The present disclosure relates to illumination systems configured to illuminate a target area, e.g., a floor of a room, using active illumination devices in optical communication with passive illumination devices. Active illumination devices serve to direct light both to the target area and to the passive illumination devices. Rather than emit illumination themselves, the passive illumination devices serve to redirect illumination received from the active illumination devices towards the target area. The active and passive illumination devices of the illumination system can be configured and arranged relative to each other in a variety of ways so a variety of intensity distributions can be provided by the illumination system. Such illumination systems can be configured to provide light for particular lighting applications, including office lighting, garage lighting, or cabinet lighting, for instance.

Various aspects of the invention are summarized as follows.

In general, in a first aspect, the invention features an illumination system that includes multiple active illumination devices spaced apart from each other and from a target surface, each of the active illumination devices comprising one or more light emitting elements (LEEs) and first redirecting optics and one or more passive illumination devices distributed between and in optical communication with the active illumination devices, each of the passive illumination devices comprising one or more second redirecting optics. For each of the active illumination devices, the first redirecting optics are arranged and configured to redirect light emitted by the one or more LEEs in a first angular range as (i) first direct light in a second angular range and (ii) indirect light in a third angular range, such that a prevalent direction of the first direct light in the second angular range is towards an associated direct portion of the target surface, and a prevalent direction of the indirect light in the third angular range is directed towards one or more of the passive illumination devices. For each of the one or more passive illumination devices, the second redirecting optics are arranged and configured to redirect the indirect light received from one or more of the active illumination devices in one or more of the third angular ranges, and to provide the redirected light as second direct light in one or more fourth angular ranges, such that a prevalent direction of the second direct light in the one or more fourth angular ranges is towards one or more associated indirect portions of the target surface.

Implementations of the first aspect may include one or more of the following features. For example, the active illumination devices and the one or more passive illumination devices may be spaced-apart from one another and from the target surface such that corresponding first and second direct light combine in a desired illumination distribution of the target surface. Divergences of the second and third angular ranges may be smaller than a divergence of the first angular range.

In general, in another aspect, the invention features an illumination system that includes at least one active illumination device, each active illumination device comprising at least one light emitting element and an optical element arranged to receive light from the at least one light emitting element and to direct illumination from the at least one light emitting element in at least two discrete illumination ranges in a cross-sectional plane, and a support for attaching the active illumination device to a ceiling and at least one passive illumination device, each active illumination device comprising a reflector and a support for attaching the passive illumination device to the ceiling. The reflector is configured such that when both the active and passive illumination devices are attached to the ceiling and spaced apart a pre-established distance from each other, the reflector receives light directed by the optical element into one of the discrete angular ranges and directs the received light toward a target surface.

Implementations of this aspect may include one or more of the following features. For example, when both the active and passive illumination devices are attached to the ceiling, the corresponding supports of the at least one active illumination device and at least one passive illumination device may be configured to position the optical element of the at least one active illumination device at a height further from the ceiling than the reflector of the at least one passive illumination device. When the at least one passive illumination device is attached to the ceiling, the support of the at least one passive illumination device may position the reflector of the passive illumination device at substantially the same height as the ceiling. When the at least one passive illumination device is attached to the ceiling, the support of the at least one passive illumination device may position the reflector of the passive illumination device at a height below the ceiling.

When the at least one active device is attached to the ceiling, light propagating in two of the at least two discrete angular ranges may propagate towards the ceiling.

When both the active and passive illumination devices are attached to the ceiling, both the active and passive illumination devices may direct light towards the target surface. When both the active and passive illumination devices are attached to the ceiling, light from the at least one active illumination device and an adjacent one of the passive illumination devices can overlap on the target surface.

In certain implementations, when both the active and passive illumination devices are attached to the ceiling, light from the illumination system incident on the target surface does not exceed a glancing angle of 40° with respect to an axis perpendicular to the ceiling.

The at least one illumination device may be elongated in a direction perpendicular to the cross-sectional plane.

The at least one active illumination device may have a plane of symmetry orthogonal to the cross-sectional plane.

The at least one active illumination device may include a light guide configured to guide light from the at least one light emitting device to the optical element.

The optical element of the at least one active illumination device may include an interface configured to reflect at least some of the light from the at least one light emitting device into two of the discrete angular ranges. The interface may be configured to transmit at least some of the light from the at least one light emitting element into at least one of the discrete angular ranges.

The at least one active illumination device may include a reflector positioned to reflect light from the optical element.

The at least one light emitting element can be a light emitting diode.

The reflector of the at least one passive illumination device may be a curved reflector (e.g., a convex reflector). In some implementations, the reflector of the at least one passive illumination element is a Fresnel reflector.

When the active and passive illumination devices are attached to the ceiling and spaced apart a pre-established distance from each other, the reflector of the passive illumination device may receive light from two active illumination devices on opposing sides of the passive illumination device.

When the active and passive illumination devices are attached to the ceiling and spaced apart a pre-established distance from each other, the at least one active illumination device can be configured to direct light to passive illumination devices on opposing sides of the active illumination device.

Among other advantages, the disclosed illumination systems may offer substantial design flexibility in the illumination profile delivered to a target area. For example, illumination systems include optical components (e.g., reflecting, refracting, scattering, and/or diffracting elements) that can be used to direct light from a light emitting element into discrete angular ranges. In this way, the systems may deliver light from a point-like light source (e.g., a light emitting diode) to an extended target surface such that the light is incident only over certain angular ranges. For instance, the light may be incident at angles close to normal incidence on a planar target area, thereby reducing or eliminating glare.

Additionally, or alternatively, the illumination systems may provide efficient distribution of light to a relatively large target area from small, but intense, light emitting elements. For example, the systems may include passive illumination devices that are installed remotely from active illumination devices and re-direct light from the active illumination devices towards the target area. In this way, the passive illumination devices may also serve to ensure that light at the target area is incident at angles that don't contribute to glare.

The term "light-emitting element" (LEE), also referred to as a light emitter, is used herein to refer to devices that emit radiation in one or more regions of the electromagnetic spectrum from among the visible region, the near infrared region and/or the ultraviolet region, when activated. Activation of an LEE can be achieved by applying a potential difference across components of the LEE and/or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes (e.g., organic light-emitting diodes, OLEDs), other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed (e.g., an LED die packaged with a phosphor). Examples of light emitting elements include also lasers and more specifically semiconductor lasers, such as vertical cavity surface emitting lasers (VCSELs) and edge emitting lasers. Further examples include superluminescent diodes and other superluminescent devices.

As used herein, providing light in an "angular range" refers to providing light that propagates in a prevalent direction and has a divergence with respect to the propagation direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

BRIEF DESCRIPTION OF THE DRAWINGS

Reference numbers and designations in the various drawings indicate exemplary aspects of implementations of particular features of the present disclosure. Like reference numbers indicate like elements.

DETAILED DESCRIPTION

The present disclosure relates to illumination systems configured to illuminate a target area, e.g., a floor of a room, a garage, etc., using active illumination devices in optical communication with passive illumination devices. The active illumination devices include light emitting elements (LEEs, such as, e.g., light emitting diodes, LEDs) and redirecting optics that are configured to provide direct illumination of the target area and indirect illumination towards a background area, e.g., away from the target area. In general, "direct" illumination refers to illumination that propagates directly from a luminaire to the target area, while "indirect" illumination refers to illumination that reflects (e.g., diffusely reflects) from another surface, often a ceiling, before illuminating the target area. In some implementations, the active illumination devices are configured to allow interdependent as well as independent control of the direct and indirect illuminations by a user. The passive illumination devices include redirecting optics (but no light emitting elements). The passive illumination devices are arranged relative to the active illumination devices to redirect, towards the target area, the indirect illumination provided by the active illumination devices. Example systems include at least one active illumination device and at least one passive illumination device.

(i) Illumination Systems Including Active and Passive Illumination Devices

Figure 1A:
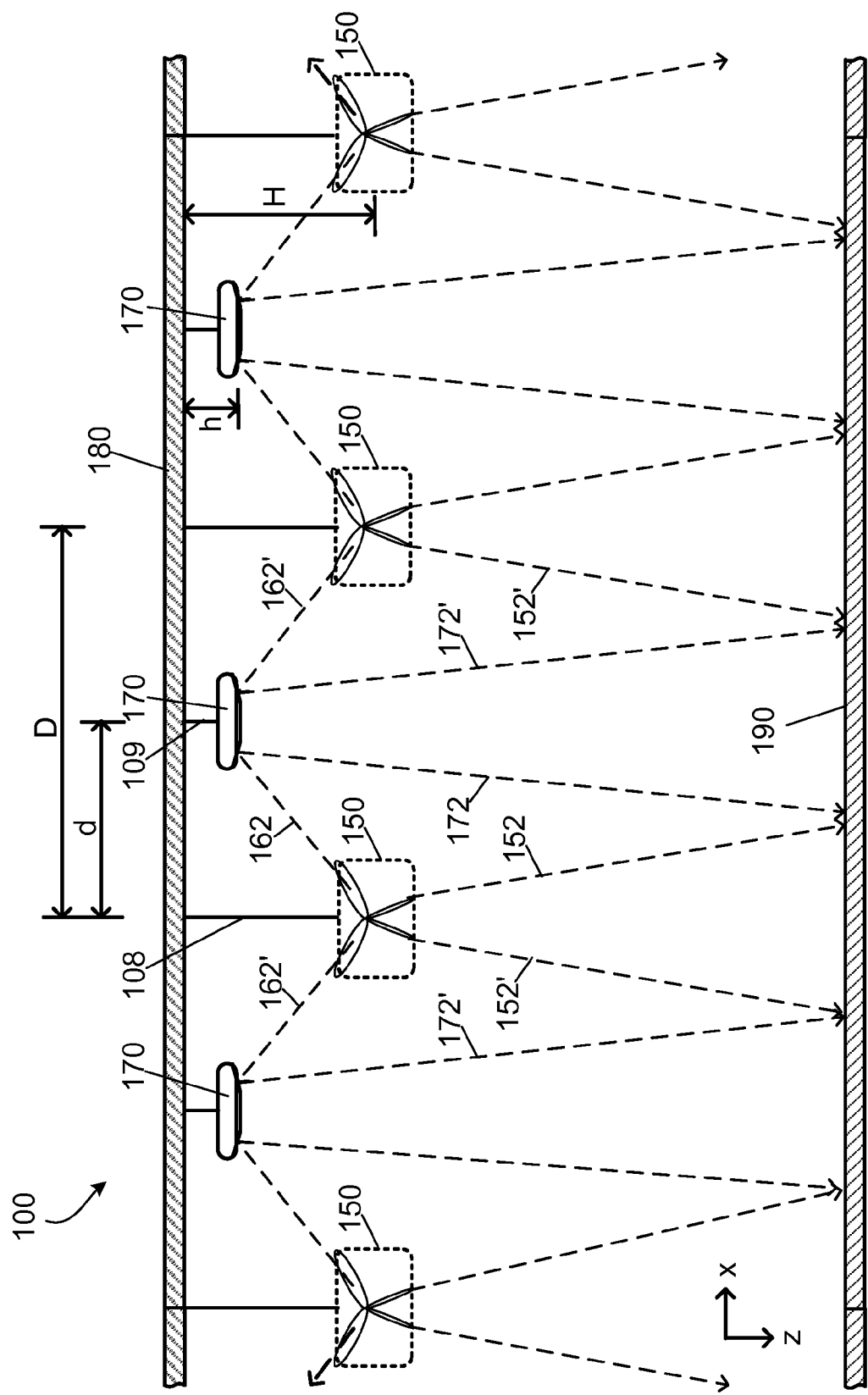
FIG. 1A shows an example of an illumination system including active illumination devices and passive illumination devices.

FIG. 1A schematically illustrates an illumination system 100 suspended from a ceiling 180 of a room and configured to illuminate the room. A Cartesian coordinate system is shown for reference. The x-y plane is parallel to the ceiling 180 and a floor 190, while the z-axis is perpendicular to both. As illustrated, the illumination system 100 includes four active illumination devices 150 in optical communication with three passive illumination devices 170, although, more generally, illumination systems can include more or fewer active and passive illumination devices. In some implementations, the active illumination devices 150 and the passive illumination devices 170 are elongated along the y-axis, perpendicular to the page.

In the example illustrated in FIG. 1A, the floor 190 is the target area for illumination system 100, and the background area is the ceiling 180. Here, the active illumination devices 150 include supports 108 that attach the illumination device thereto and suspend the active illumination devices a height H therefrom. In some implementations, the supports 108 can be wires, rods, or combinations thereof.

In general, the active illumination devices 150 include one or more light emitting elements (LEEs, such as, e.g., light emitting diodes (LEDs)) configured to emit light, and redirecting optics coupled with the LEEs. Depending on the embodiment, the system is configured to redirect the emitted light as output light in one or more direct angular ranges 152, 152' and indirect angular ranges 162, 162'. In this manner, the active illumination devices 150 are configured to provide direct illumination of the target area (in accordance with the one or more direct angular ranges 152, 152'), and indirect illumination towards the ceiling 180 (as illustrated by the indirect angular distributions 162, 162'). While the target area in FIG. 1A is the floor 190, more generally the target area can be a workspace on a desk, a floor or other target area.

The passive illumination devices 170 include supports (e.g., rods, wires, or combinations thereof) which attach the passive illumination devices to the ceiling 180 and suspend them a height h therefrom. The support can have an appropriate length to support the passive illumination device 170 at a specified distance (h≠0) from the ceiling. In general, the passive illumination devices are positioned to receive illumination directed by the active illumination devices into ranges 162 and 162', so h depends on the design and position of the active illumination devices 150. In general, h<H. In certain embodiments, H–h is in a range from about six inches to about three feet. In some implementations, the passive illumination devices 170 can be supported directly from the ceiling 180 or integrated in the ceiling 180, without the use of wires or rods (h=0).

The passive illumination devices 170 include redirecting optics (not shown in FIG. 1A). As suggested by their name, the passive illumination devices 170 do not include LEEs and thus do not generate light themselves. The passive illumination devices 170 are arranged relative to the active illumination devices 150 to receive light emitted by the active illumination devices 150. The redirecting optics of the passive illumination devices 170 are arranged to redirect, towards the target area, the indirect illumination received from the active illumination devices 150 in the indirect angular ranges 162, 162'. The redirecting optics redirect the light from active illumination devices 170 in angular ranges 172, 172'. In this manner, the passive illumination devices 170 provide direct illumination of the target area (in the form of redirected light in the direct angular ranges 172, 172'). Examples of passive illumination devices 170 are described below in connection with FIGS. 9 and 10.

In general, the illumination system 100 is configured to provide a particular light intensity distribution on a target surface, subject to given constraints. In FIG. 1A, the illumination system 100 may be configured to substantially uniformly illuminate the floor 190 (e.g., to obtain approximately 10% overlap between each of adjacent direct angular ranges 152, 172, 172' and 152' at the floor level, thereby providing continuous illumination of the floor with little variation in intensity), and to be in conformance with glare standards (e.g., light redirected towards the floor 190 in any of the direct angular ranges 152, 152', 172 and 172' does not exceed a glancing angle of 40° with respect to the z-axis.) In addition to maintaining glare standards, the illumination system 100 may be configured such that a distance D (see FIG. 1A) between nearest active illumination devices 150 to be larger than a distance between conventional luminaries required in conventional illumination systems that do not employ passive illumination devices 170.

Such configurations of the illumination system 100 can be implemented by selecting appropriate combinations of system parameters including (i) direct angular ranges 152, 152' of direct light output by the active illumination devices 150; (ii) indirect angular ranges 162, 162' of indirect light output by the active illumination devices 150 relative to the direct angular ranges 172, 172' of light redirected by the passive illumination devices 170; (iii) distance D between nearest active illumination devices 150, e.g., about 6 ft or more, about 10 ft or more, about 15 ft or more, about 24 ft; (iv) distance d between adjacent active illumination devices 150 and passive illumination devices 170, such that D>d, e.g., about 3 ft or more, about 5 ft or more about 8 ft or more, about 10 ft or more, about 12 ft; (v) distance H from the ceiling 180 to an effective center of the active illumination devices 150, e.g., H=3 ft; (vi) distance h from the ceiling 180 to an effective center of the passive illumination devices 170, such that H≥h=0 or 3 ft, for instance.

In general, these parameters are selected based on the desired illumination intensity and illumination directions desired at the target area. For instance, where a larger range of incident angles (relative to the z-axis) are desired, greater separation between the passive and active illumination devices is permissible.

Figure 1B:
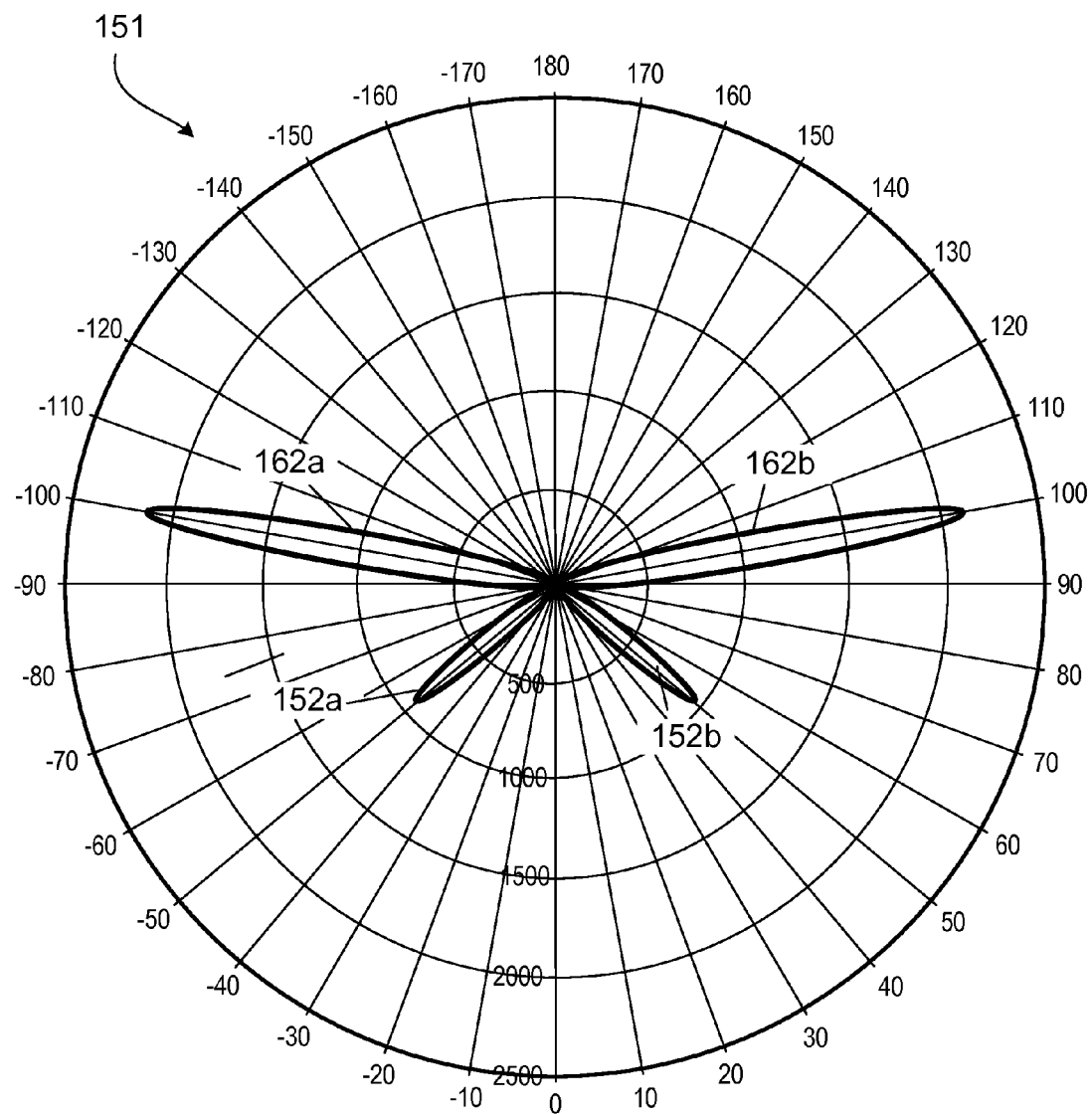
FIG. 1B shows an example of an intensity profile of an active illumination device used in the illumination system of FIG. 1A.

FIG. 1B shows, for the x-z plane, an example light intensity profile 151 of an active illumination device 150. Here, the z-axis corresponds to the axis from 0° to 180°, where 0° is in the direction of the floor. The intensity profile 151 includes four lobes 152a, 152b, 162a, and 162b. Depending on the embodiment, a distinction between lobes 152a and 152b may be notional as both may be superimposed, for example, and appear indistinguishable from each other. The result may be similar to what is described with respect to FIG. 1C. Here, active illumination devices 150 are configured to direct substantially all of the indirect (background) light 162a, 162b into a range of polar angles between −90° and −110°, and between +90° and +110° in a cross-sectional plane (x-z) of the active illumination devices 150. The active illumination devices 150 are also configured to direct substantially all of the forward (e.g., direct) light into a pair of narrow lobes 152a, 152b having a range of polar angles having maximum intensity at −50° and +50° in the x-z cross-sectional plane, respectively. Lobes 152a, 152b of the light intensity profile 151 correspond to the direct angular ranges 152, 152' shown in FIG. 1A and lobes 162a, 162b correspond to indirect angular ranges 162, 162'.

Figure 1C:
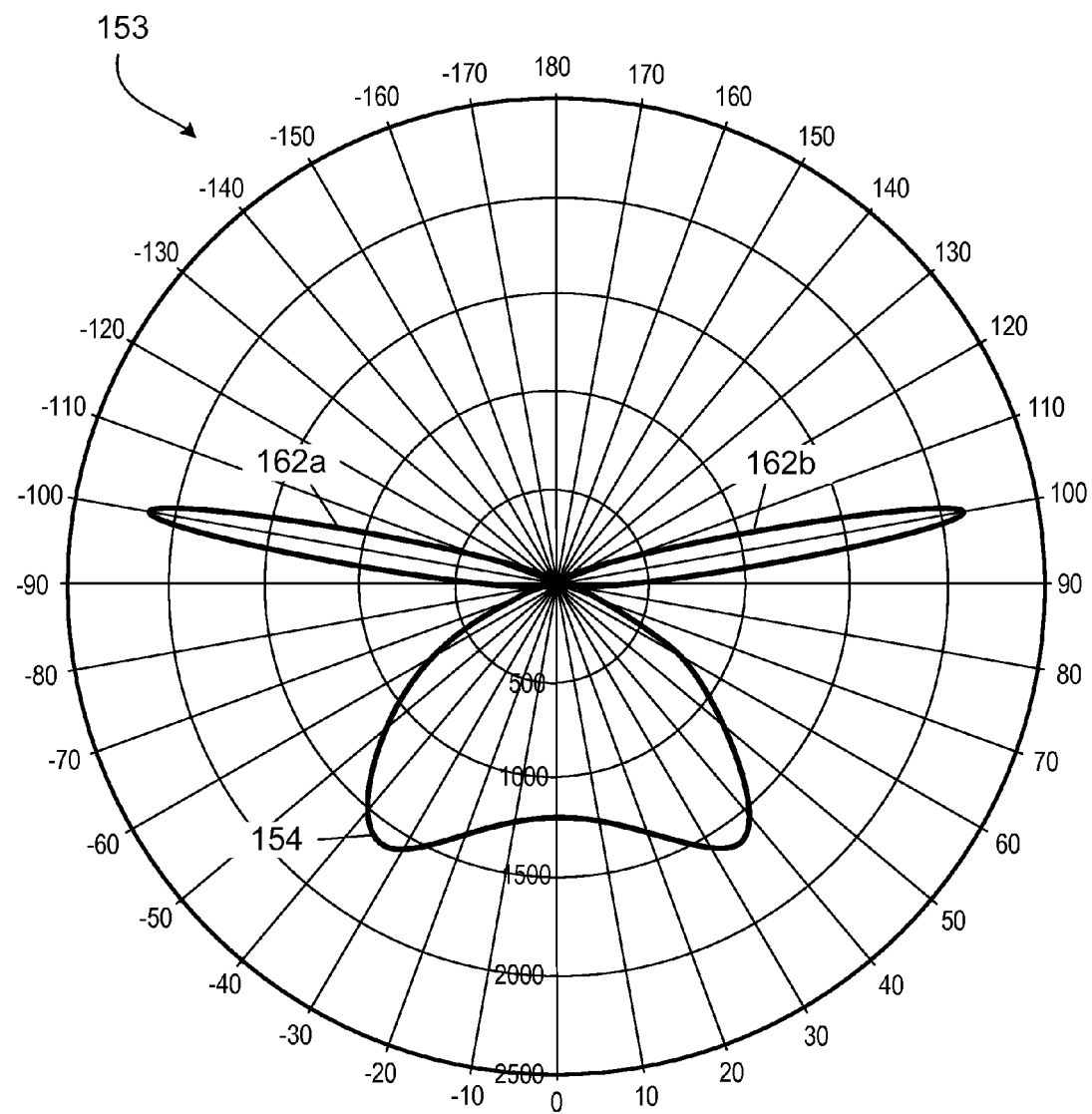
FIG. 1C shows another example of an intensity profile of an active illumination device used in the illumination system of FIG. 1A.

FIG. 1C shows another example light intensity profile 153 from an active illumination device 150. Here, intensity profile 153 includes lobes 162a and 162b having maximal intensity at −100° and +100°, respectively. These lobes correspond to indirect illumination. Intensity profile 153 also includes a single lobe 154 in the forward direction, providing illumination in an angular range from about −60° to +60°.

In general, light emitting in the forward direction (e.g., lobes 152a, 152b, or lobe 154) may be within a ranged between about −50° and about +50° (e.g., from about −60° and about +60°, from about −70° and about)+70° in order to reduce glare from the illumination system.

As described in detail below, composition and geometry of components of the active illumination devices 150 affect the light intensity profile 151 and may be selected to provide direct and indirect illumination into ranges having varying angular width and direction. Examples of active illumination devices follow.

(ii) Active Illumination Devices

Figure 2A:
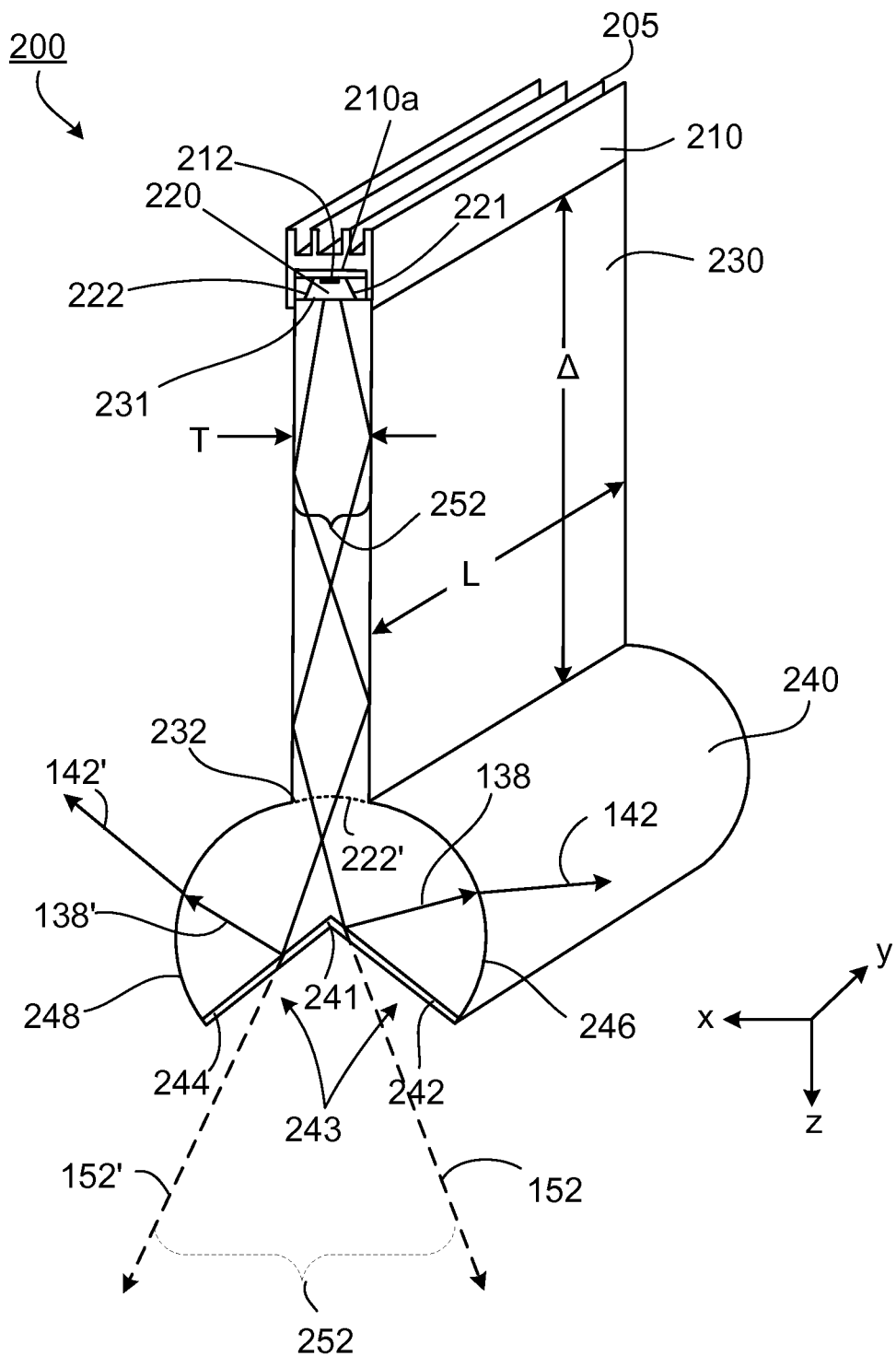
FIGS. 2A-2G show aspects of various embodiments of active illumination devices.

FIG. 2A shows an example of an active illumination device 200. The active illumination device 200 includes a mount 210 having a plurality of LEEs 212 distributed along a first surface 210a of the mount 210. The active illumination device 200 includes an optical coupler 220, a light guide 230, and an optical extractor 240. Light emitted by the LEEs 212 couples into the light guide 230 (either directly or upon reflection by surfaces 221 and 222 of coupler 220) and is guided by the light guide to optical extractor 240. In optical extractor 240, the light is incident on surfaces 242 and 244, where part of the light is reflected and part of the light is transmitted. The transmitted light exits active illumination device 200 into angular range 252 adjusted (typically enlarged) by the relative refractive index. The reflected light exits the optical extractor through surfaces 246 and 248. The active illumination device 200 is an example of an active illumination device 150 (see FIG. 1A), where the direct illumination corresponds to light output in the angular ranges 152, 152', and indirect illumination corresponds to light output in the angular ranges 142, 142'. Another active illumination device can be configured to output light in forward direction in an angular range qualitatively similar to angular range 154 of FIG. 1C, for example As shorthand, the positive z-direction is referred to herein as the "forward" direction and the negative z-direction is the "backward" direction. Sections through the illumination device parallel to the x-z plane are referred to as the "cross-section" or "cross-sectional plane" of the illumination device. In this example, active illumination device 200 extends along the y-direction, so this direction is referred to as the "longitudinal" direction of the active illumination device. Lastly, implementations of active illumination devices can have a plane of symmetry parallel to the y-z plane. This is referred to as the "symmetry plane" of the active illumination device.

Mount 210, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 212 on the mount 210 will generally depend, inter alia, on the length L, where more LEEs may be used for longer luminaire modules. In some implementations, the plurality of LEEs 212 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the active illumination device 200 has an LEE density along its length of 0.1 LEE per centimeter or more (e.g., 0.2 per centimeter or more, 0.5 per centimeter or more, 1 per centimeter or more, 2 per centimeter or more). In implementations, LEEs can be evenly spaced along the length, L, of the luminaire module. In some implementations, a heat-sink 205 can be attached to the mount 210 to extract heat emitted by the plurality of LEEs 212. The heat-sink 205 can be disposed on a surface of the mount 210 opposing the side of the mount 210 on which the LEEs 212 are disposed.

Optical coupler 220 includes one or more solid pieces of transparent optical material (e.g., a glass material or a transparent organic plastic, such as polycarbonate or acrylic) having surfaces 221 and 222 positioned to reflect light from the LEEs 212 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of active illumination device 200. Alternatively, the cross-sectional profile can vary. For example, surfaces 221 and/or 222 can be curved out of the x-z plane.

The surface of optical coupler 220 adjacent upper edge of light guide 230 is optically coupled to edge 231. In some embodiments, the surfaces of the interface are attached using a material that substantially matches the refractive index of the material forming the optical coupler 220 or light guide 230 or both. For example, optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

In general, optical couplers 220 are designed to restrict the angular range of light entering the light guide 230 (e.g., to within +/−40 degrees) so that at least a substantial amount of the light is coupled into spatial modes in the light guide 230 that undergoes TIR at the side surfaces of the light guide. The example light guide 230 has a uniform thickness T, which is the distance separating two planar opposing surfaces of the light guide. Generally, T is sufficiently large so the light guide has an aperture at an upper edge 231 sufficiently large to approximately match (or exceed) the aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

Light guide 230 is formed from a piece of transparent material (e.g., glass material such as BK7, fused silica or quartz glass, or a transparent organic plastic, such as polycarbonate or acrylic) that can be the same or different from the material forming optical couplers 220. The example light guide 230 extends length L in the y-direction, has a uniform thickness T in the x-direction, and a uniform depth A in the z-direction. The dimensions A and T are generally selected based on the desired optical properties of the light guide and/or the direct/indirect intensity distribution. During operation, light coupled into the light guide 230 from optical coupler 220 (depicted by rays 252 or angular range 252) reflects off the planar surfaces of the light guide by total internal reflection and spatially mixes within the light guide. The mixing can help achieve illuminance and/or color uniformity at the lower edge 232 of the light guide 230 at optical extractor 240. The depth, $\Delta$, of light guide 230 can be selected to achieve adequate uniformity at the exit aperture (i.e., at end 232) of the light guide. In some implementations, $\Delta$ is in a range from about 1 cm to about 20 cm (e.g., 2 cm or more, 4 cm or more, 6 cm or more, 8 cm or more, 10 cm or more, 12 cm or more).

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

Optical extractor 240 is also composed of a solid piece of transparent optical material (e.g., a glass material or a transparent organic plastic, such as polycarbonate or acrylic) that can be the same as or different from the material forming light guide 230. In the example implementation shown in FIG. 2A, the piece of dielectric material includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the active illumination device 200.

Surfaces 242 and 244 are coated with a highly reflective material (e.g., a highly reflective metal, such as aluminum or silver) over which a protective coating may be disposed. Thus, surfaces 242 and 244 provide a highly reflective optical interface for light entering an input end of the optical extractor from light guide 230. The surfaces 242 and 244 include portions that are transparent to the light entering at the input end of the optical extractor. For example, these portions can be uncoated regions or discontinuities (e.g., slots, slits, apertures) of the surfaces 242 and 244. The transmitted light exits the optical extractor 240 through surfaces 242 and 244 in angular ranges 152 and 152', respectively. The transmitted light also may also be refracted, In the x-z cross-sectional plane, the lines corresponding to surfaces 242 and 244 can have the same length and form an apex or vertex 241, e.g. a v-shape that meets at the apex 241. In general, the included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more).

In the example implementation shown in FIG. 2A, the output surfaces of the optical extractor 246 and 248 are curved with a constant radius of curvature that is the same for both. Accordingly, active illumination device 200 has a plane of symmetry intersecting apex 241 parallel to the y-z plane. Because surfaces 246 and 248 are curved, they may serve to focus light (e.g., reduce the amount of divergence of the light) reflected by redirecting surfaces 242 and 244.

In general, the geometry of the optical extractor 240 plays a role in shaping the lobes of light emitted by the active illumination device. For example, the smaller the angle at apex 241, the lower the angle of incidence the reflected light will have and the smaller the angle of its deflection. Accordingly, the vertex angle can be used to provide the desired direction of the lobes of indirect light emitted by the active illumination device.

The emission spectrum of the active illumination device 200 corresponds to the emission spectrum of the LEEs 212. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in active illumination device 200. For example, a wavelength-conversion material may be disposed proximate the LEEs 212, adjacent surfaces 242 and 244 of optical extractor 240, on the exit surfaces 246 and 248 of optical extractor 240, placed at a distance from the exit surfaces 246 and 248 and/or at other locations.

In some embodiments, a layer of wavelength-conversion material may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed by R/n or even smaller $R*(1\pm n^2)^{(-1/2)}$, where R is the radius of curvature of the light-exit surfaces (246 and 248 in FIG. 2) of the extractor and n is the index of refraction of the portion of the extractor that is opposite of the wavelength-conversion material as viewed from the reflective surfaces (242 and 244 in FIG. 2A). The support structure may be transparent self-supporting structure. The light-converting material diffuses light as it converts the wavelengths, provides mixing of the light and can help uniformly illuminate tertiary reflectors (not shown in FIG. 2A).

As noted previously, the geometry of optical extractor 240 plays an important role in shaping the light emitted by the active illumination device. For instance, the shape of surfaces 242 and 244 may vary in accordance with the desired emission. While surfaces 242 and 244 are depicted as planar surfaces, other shapes are also possible. For example, these surfaces can be curved or faceted. Curved redirecting surfaces 242 and 244 can be used to narrow or widen the beam. Depending of the divergence of the angular range of the light that is received at the input end of the optical extractor, concave reflective surfaces 242, 244 can narrow the light intensity distribution output by the optical extractor 240, while convex reflective surfaces 242, 244 can widen the light intensity distribution output by the optical extractor 240. As such, suitably configured redirecting surfaces 242, 244 may introduce convergence or divergence into the light. Such surfaces can have a constant radius of curvature, can be parabolic, hyperbolic, or have some other curvature.

Figure 2B:
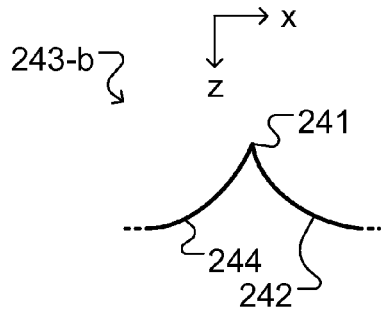
Figure 2C:
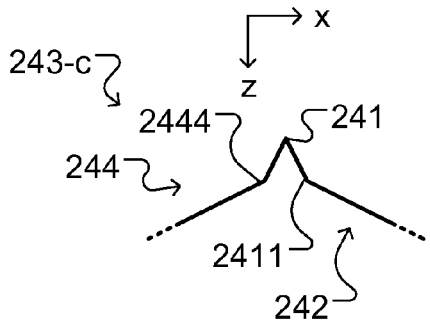
Figure 2D:
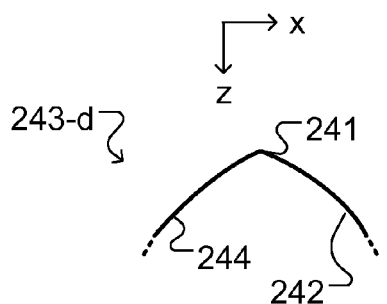

FIGS. 2B and 2D show redirecting surfaces 243-*b* and 243-*d* having an apex 241 that separates the curved redirecting surface 242, 244. It should be noted that the apex 241 of the redirecting surface can be a rounded vertex with a non-zero radius of curvature. Here, the redirecting surface 242, 244 have arcuate shapes in the cross-sectional plane substantially perpendicular to the longitudinal dimension of the active illumination device 200. For example, the first and second portions of the redirecting surface 242, 244 can be parabolic, hyperbolic, and/or can have constant curvatures different from each other. Moreover, curvatures of the first and second portions of the redirecting surface 242, 244 can be both negative (e.g., convex with respect to a direction of propagation of light from the input end of the extractor to the redirecting surface), can be both positive (e.g., concave with respect to the propagation direction), or one can be positive (convex) and the other one can be negative (concave).

Figure 2E:
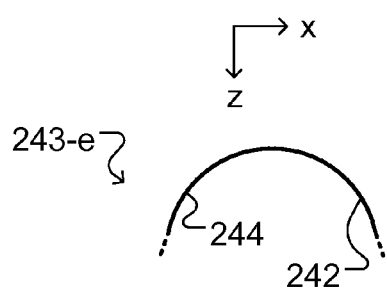

FIG. 2E shows a redirecting surface 243-*e* shaped as an arc of a circle, ellipse, parabola or other curve. In this case, the first and second portions of the redirecting surface 242, 244 represent first and second portions of the arc of the circle. The curvature of the redirecting surface 243 is negative (e.g., convex with respect to a direction of propagation of light from the input end of the extractor to the redirecting surface 243).

FIG. 2C shows a redirecting surface 243-*c* that includes faceted surfaces 242, 244. Here, the surfaces meet at apex 241. Additionally, the facets forming surface 242 meet at an apex 2444 while the facets forming surface 242 meet at an apex 2411. The facets of each surface can have linear or arcuate shapes. Moreover, the facets may be arranged to reflect the light received from the input end of the extractor in different angular sub-ranges. In this manner, light provided by the different facets of each of the surfaces 242 and 244 is output at the output surfaces 246 and 248, respectively, as two intensity lobes that can be manipulated differently, e.g., to illuminate different targets.

Figure 2F:
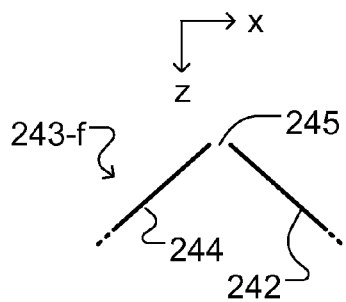

FIG. 2F shows a redirecting surface 243-*f* where the redirecting surfaces 242 and 244 are separated by a slot 245, in general a suitably formed aperture. Slot 245 corresponds to a gap in the reflective material at the surface and allows for light to be transmitted in a forward direction out of the optical extractor. In general, the width of the slot 245 may vary as desired, in accordance with the desired proportion of light to be transmitted by the optical extractor.

Figure 2G:
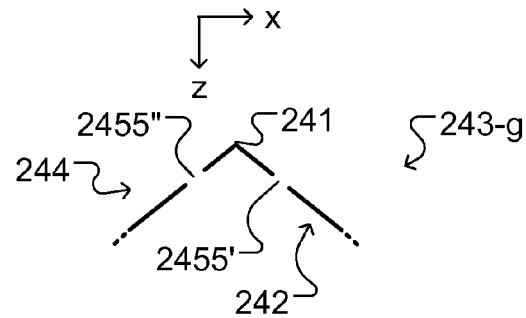

FIG. 2G shows a redirecting surface 243-*g* in which surface 242 includes a slot 2455' and surface 244 includes a slot 2455". Such slots may represent an opening in a coating providing a reflecting layer of the redirecting surface 243-*g* and allows transmission of at least some of the light received from the light guide.

For redirecting surfaces 243-*f* and 243-*g*, each slot may extend along the entire longitudinal extension of the active illumination device 200. Alternatively, redirecting surfaces may include multiple slots each extending a fraction of the length of the device. Moreover, while embodiments showing a single slot and two slots (in a cross-section) are illustrated, it will be appreciated that any number of slots may be included depending on the desired transmission properties of the optical extractor. Furthermore, embodiments may feature additional optical elements located at the slots to shape the transmitted light. For example, optical extractors may include focusing or defocusing elements, diffusing elements, and/or diffractive elements that provide additional light shaping to the light transmitted by the slots.

In addition, the curves corresponding to each of the cross-sectional planes illustrated in FIGS. 2B-2G can have different shapes and different discontinuities in other cross-sectional planes along the longitudinal dimension of the active illumination device 200. In general, different cross-sections of a redirecting surface 243 can have different combinations of disjoint or joined piecewise differentiable curves.

In the examples illustrated in FIGS. 2F-2G, the active illumination device 200 can be used as an active illumination device 150, where direct illumination corresponds to light output through the transparent portions of the redirecting surface 243-*f* or 243-*g*, and indirect illumination corresponds to light output through surfaces 246/248 of the active illumination device 200, as described below in connection with FIGS. 3-4.

Figure 3:
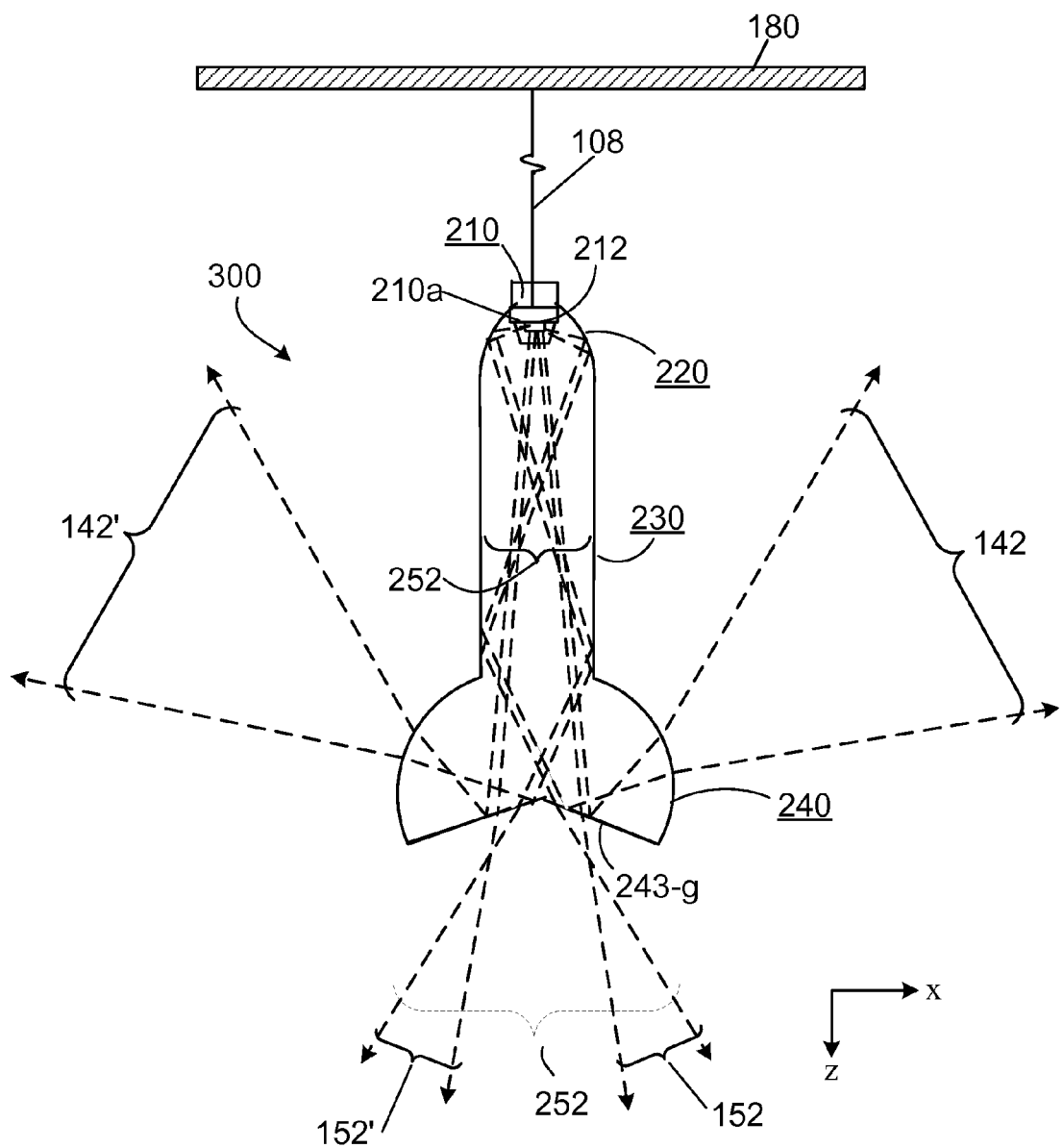
FIG. 3 shows an example of a solid embodiment of an active illumination device.
Figure 4:
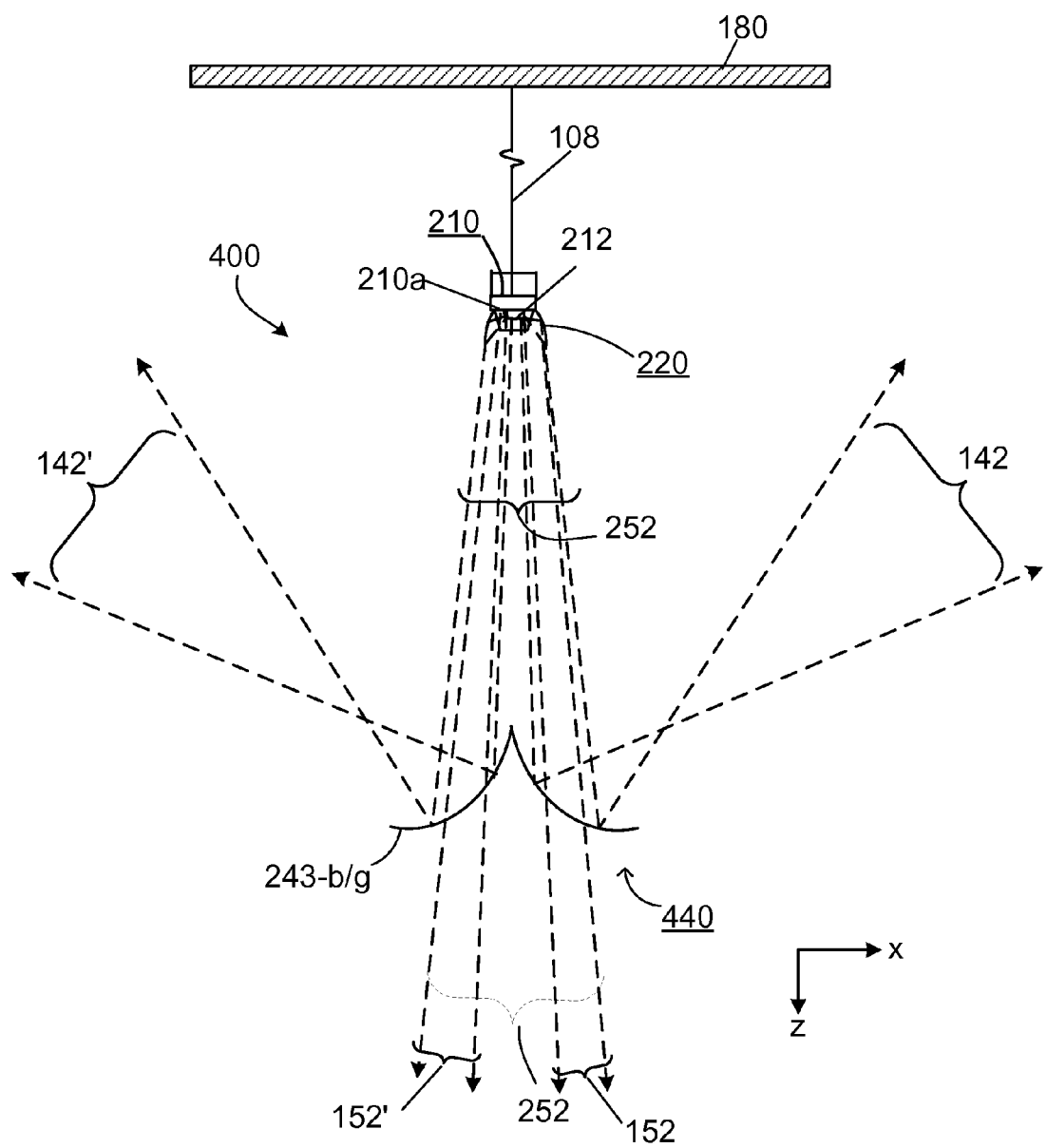
FIG. 4 shows an example of a hollow embodiment of an active illumination device.

In some embodiments, it is also possible to use redirecting surfaces that do not include slots in the reflective layer to provide both direct and indirect light as shown in FIGS. 3-4. For example, rather than providing a highly-reflective layer on the redirecting surface, a partially-reflecting layer may instead be used (e.g., a partially-silvered surface). In this way, the redirecting surface (e.g., as illustrated in FIGS. 2B-2E) acts as a beam splitter rather than a mirror, and transmits a desired portion of incident light, while reflecting the remaining light. In certain embodiments, additional optical layers may be included adjacent the partially-reflecting layer that can further shape the transmitted light. For example, a diffusing layer may be included. Alternatively, or additionally, a lens or lens array may be included (e.g., such as a micro-structured film composed of lenticular lenses or prisms).

In the examples illustrated in FIGS. 2B-2E, where a highly reflective material is included at the redirecting surface, light is output from the optical extractor 240 of the active illumination device 200 only through surfaces 246/248. In this case, active illumination device 200 can be used as a component of the active illumination device 150, where the output light is further redirected by tertiary reflectors to provide direct illumination, as described below in connection with FIGS. 5-8.

Moreover, the shape of output surfaces of the optical extractor 246 and 248 can vary too, and thus, the surfaces 246 and 248 can steer and shape the beam of light. For example, the radius of curvature of these surfaces can be selected so that the surfaces introduce a desired amount of convergence into the light. Aspheric surfaces can also be used. Similar properties noted above in connection with FIGS. 2B-2G regarding contours of the redirecting surface of the extractor 243 in cross-sectional planes substantially perpendicular to the longitudinal dimension of the active illumination device 200 apply to contours of the output surfaces of the extractor 246, 248 in such cross-sectional planes.

In general, choices of redirecting surfaces described in FIGS. 2B-2G may provide an additional degree of freedom for modifying the (direct or indirect or both) intensity distribution (e.g., illumination pattern) of the light output by the active illumination devices described in connection with FIGS. 3-8. In general, two or more of the active illumination device 200, the direct secondary reflectors, the indirect optics, the arrangement of indirect and direct LEEs with respect to a mount of an illumination device, and the first and second apexes may be iteratively modified in their spatial position and/or optical properties (spatial shape of reflective surfaces, index of refraction of solid material, spectrum of emitted or guided light etc.) to provide a predetermined direct and/or indirect illumination distribution.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire modules can include other features useful for tailoring the intensity profile. For example, in some implementations, luminaire modules can include an optically diffuse material that scatters light, thereby homogenizing the luminaire module's intensity profile. For example, surfaces 242 and 244 can be rough or a diffusely reflecting material, rather than a specular reflective material, can be coated on these surfaces. Accordingly, the optical interfaces at surfaces 242 and 244 can diffusely reflect light, scattering light into broader lobes than would be provided by similar structures that utilize specular reflection at smooth interfaces. In some implementations, these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

In certain implementations, a light scattering material can be disposed on surfaces 246 and 248 of optical extractor 240 (e.g., surfaces 246 and 248 may be rough or include a layer of a diffusely transmitting material). Alternatively, or additionally, surfaces 246 and 248 need not be surfaces having a constant radius of curvature. For example, surfaces 246 and 248 can include portions having differing curvature and/or can have structure thereon (e.g., structural features that scatter or diffract light).

FIG. 3 shows an example of an active illumination device 300 to be used in the illumination system 100 of FIG. 1A. In this example, the active illumination device 300 includes a solid embodiment of the active illumination device 200 described above in connection with FIG. 2A. Further in this example, the active illumination device 300 is supported by a ceiling 180 through a support 108. In some implementations, the active illumination device 300 is elongated along the y-axis (perpendicular to the page.) The active illumination device 300 includes a mount 210, one or more LEEs 212, primary optics 220 (also referred to as couplers), a light guide 230 and a solid secondary optic 240 (also referred to as an optical extractor).

In this example, the mount 210 has a first surface 210a with a normal parallel to the z-axis. The multiple LEEs 212 are operatively disposed on the first surface 210a of the mount, such that the LEEs 212 emit, during operation, light in a first angular range with respect to the normal to the first surface 210a of the mount 210.

The primary optics 220 are arranged on the first surface 210a and coupled with the LEEs 212. The primary optics 220 are shaped to redirect light received from the LEEs 212 in the first angular range, and to provide the redirected light in a second angular range 252. A divergence of the second angular range 252 is smaller than a divergence of the first angular range at least in the x-z plane. The light guide 230 includes input and output ends. In this case, the input and output ends of the light guide 230 have substantially the same shape. The input end of the light guide 230 is coupled to the primary optics 220 to receive the light provided by the primary optics 220 in the second angular range 252. Further, in this example, the light guide 230 is shaped to guide the light received from the primary optics 220 in the second angular range and to provide the guided light in substantially the same second angular range 252 with respect to the first surface 210a of the mount 210 at the output end of the light guide 230.

The solid secondary optic 240 includes an input end, a redirecting surface 243-g opposing the input end and first and second output surfaces. The input end of the solid secondary optic 240 is coupled to the output end of the light guide 230 to receive the light provided by the light guide 230 in the second angular range 252. In this case, the redirecting surface 243-g has been described above in connection with FIG. 2G. The redirecting surface 243-g has first and second portions that reflect the light received at the input end of the solid secondary optic 240 in the second angular range 252, and provide the reflected light in third and fourth angular ranges with respect to the normal to the first surface 210a of the mount 210 towards the first and second output surfaces, respectively. At least prevalent directions of propagation of light in the third and fourth angular ranges are different from each other and from a prevalent direction of propagation of light in the second angular range 252 at least perpendicular to the y-axis. Additionally, some regions of the first and second portions of the redirecting surface 243-g are transparent (e.g., are uncoated with a reflecting layer, or have slots, apertures, etc.), such that the first and second portions of the redirecting surface 243-g transmit (and sometime refract) the light received at the input end of the solid secondary optic 240 in the second angular range 252, and output the transmitted ("leaked") and refracted light in fifth 152 and sixth 152' angular ranges with respect to the normal to the first surface 210a of the mount 210, respectively, outside the first and second portions of the redirecting surface 243-g. Moreover, prevalent directions of propagation of light in the fifth 152 and sixth 152' angular ranges are different from each other and have a non-zero component parallel with the normal to the first surface 210a of the mount 210. Note that when transmission ("leakage") of light in fifth 152 and sixth 152' angular ranges occurs through apertures of planar first and second portions of the redirected surface 243-f or 243-g, a combination of the fifth 152 and sixth 152' angular ranges corresponds to the second angular range 252 of the light received at the input end of the solid secondary optic 240 adjusted (typically enlarged) by the relative refractive index.

The first output surface is shaped to refract the light provided by the first portion of the redirecting surface 243-g in the third angular range as first refracted light, and to output the first refracted light in a seventh angular range 142 with respect to the normal to the first surface 210a of the mount 210 outside the first output surface of the solid secondary optic 240. The second output surface is shaped to refract the light provided by the second portion of the redirecting surface 243-g in the fourth angular range as second refracted light, and to output the second refracted light in an eighth angular range 142' with respect to the normal of the first surface 210a of the mount 210 outside the second output surface of the solid secondary optic 240. Moreover, prevalent directions of propagation of light in the seventh 142 and eighth 142' angular ranges are different from each other and have a non-zero component antiparallel with the normal to the first surface 210a of the mount 210.

In this manner, in some implementations, the active illumination device 300 provides direct illumination (in angular ranges 152, 152') on a target surface located in the positive direction of the z-axis (e.g., on the floor 190) and indirect illumination (in angular ranges 142, 142') towards the ceiling 180. In other implementations, the active illumination device 300 provides direct illumination (in the second angular range 252) on the target surface located in the positive direction of the z-axis (e.g., on the floor 190) and indirect illumination (in angular ranges 142, 142') towards the ceiling 180.

FIG. 4 shows another example of an active illumination device 400 to be used in the illumination system 100 of FIG. 1A. In this example, the active illumination device 400 includes a "hollow embodiment" (i.e., embodiments that do not include a light guide or solid optical extractor) of the luminaire module described above in connection with FIG. 2A. Further in this example, the active illumination device 400 is supported by a ceiling 180 through a support 108. In some implementations, the active illumination device 400 is elongated along the y-axis (perpendicular to the page.) The active illumination device 400 includes a mount 210, multiple LEEs 212, primary optics 220 and a secondary optic 440.

In this example, the mount 210 has a first surface 210a with a normal parallel to the z-axis. The multiple LEEs 212 are operatively disposed on the first surface 210a of the mount, such that the LEEs 212 emit, during operation, light in a first angular range with respect to the normal to the first surface 210a of the mount 210.

The primary optics 220 are arranged on the first surface 210a and coupled with the LEEs 212. The primary optics 220 are shaped to redirect light received from the LEEs 212 in the first angular range, and to provide the redirected light in a second angular range 252. A divergence of the second angular range 252 is smaller than a divergence of the first angular range at least in the x-z plane.

The secondary optic 440 includes a redirecting surface 243-b/g. In this case, the redirecting surface 243-b/g has first and second portions that are shaped as described above in connection with FIG. 2B. In addition, some regions of the first and second portions of the redirecting surface 243-b/g are transparent (e.g., are uncoated with a reflecting layer, or have slots, apertures, etc.) The first and second portions of the redirecting surface 243-b/g reflect the light received from the primary optics 220 in the second angular range 252, and provide the reflected light in third 142 and fourth 142' angular ranges with respect to the normal to the first surface 210a of the mount 210, respectively. At least prevalent directions of propagation of light in the third 142 and fourth 142' angular ranges are different from each other and from a prevalent direction of propagation of light in the second angular range 252 at least perpendicular to the y-axis. Moreover, prevalent directions of propagation of light in the third 142 and fourth 142' angular ranges are different from each other and have a non-zero component antiparallel with the normal to the first surface 210a of the mount 210.

Additionally, the transparent regions of the first and second portions of the redirecting surface 243-b/g transmit the light received from the primary optics 220 in the second angular range 252, and output the transmitted ("leaked") light in fifth 152 and sixth 152' angular ranges with respect to the normal to the first surface 210a of the mount 210, respectively. Note that in this case, a combination of the fifth 152 and sixth 152' angular ranges corresponds to the second angular range 252 of the light received from the primary optics 220. Moreover, prevalent directions of propagation of light in the fifth 152 and sixth 152' angular ranges are different from each other and have a non-zero component parallel with the normal to the first surface 210a of the mount 210. Note that when transmission ("leakage") of light in fifth 152 and sixth 152' angular ranges may occur without refraction (e.g., through apertures of the redirected surface 243-b/g), a combination of the fifth 152 and sixth 152' angular ranges corresponds to the second angular range 252 of the light received at the secondary optic 440.

In this manner, in some implementations, the active illumination device 400 provides direct illumination (in angular ranges 152, 152') on a target surface located in the positive direction of the z-axis (e.g., on the floor 190) and indirect illumination (in angular ranges 142, 142') towards the ceiling 180. In other implementations, the active illumination device 400 provides direct illumination (in the second angular range 252) on the target surface located in the positive direction of the z-axis (e.g., on the floor 190) and indirect illumination (in angular ranges 142, 142') towards the ceiling 180.

Figure 5:
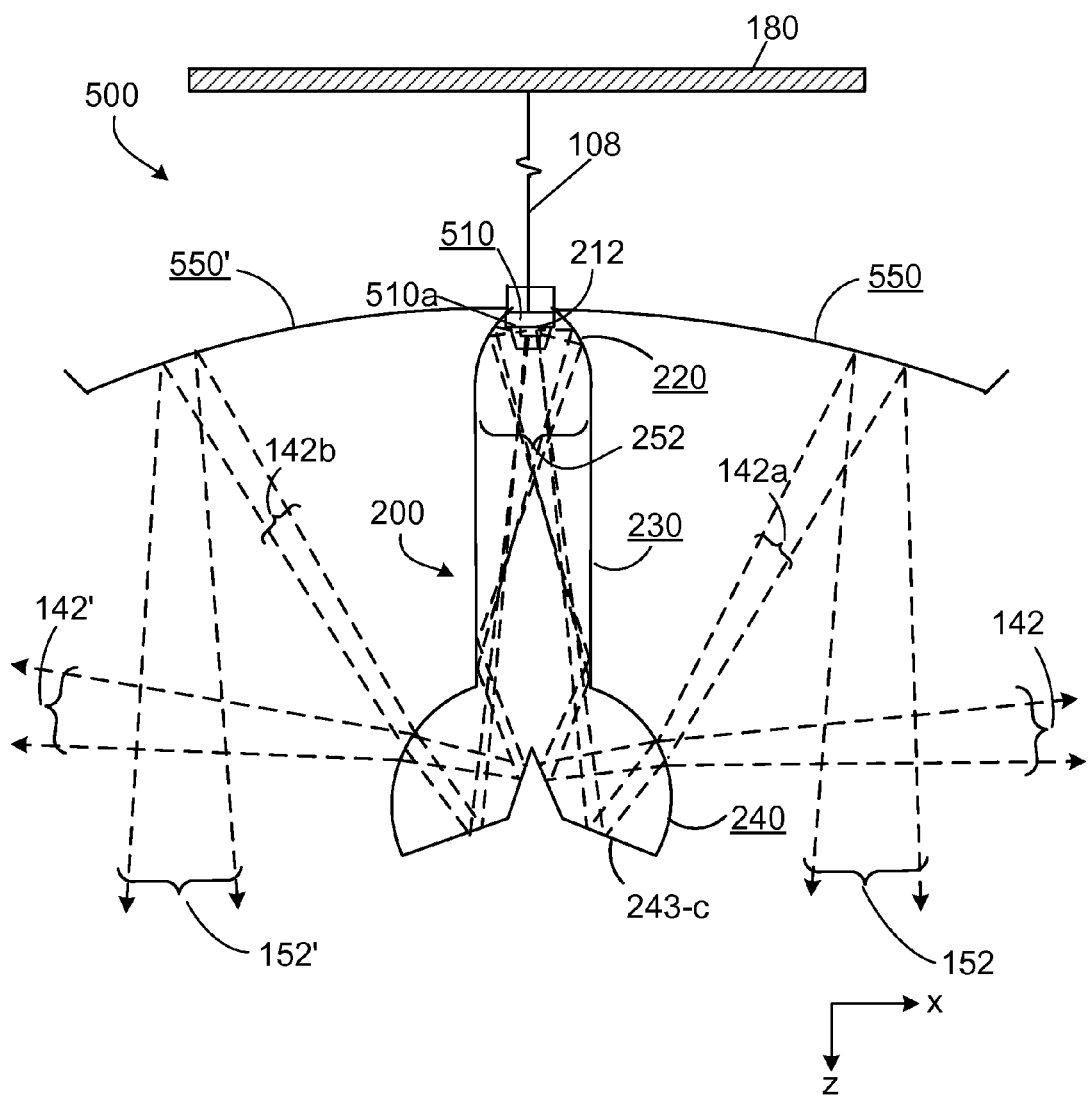
FIG. 5 shows another example of an active illumination device.

In some embodiments, active illumination devices may include additional optical elements in order to further tailor the provided illumination. For example, FIG. 5 shows an active illumination device 500 to be used in the illumination system 100 which includes a mount 510 that has a first surface 510a with a normal parallel to the z-axis. The mount supports a solid embodiment of the active illumination device 200 (described above in connection with FIGS. 2A and 3), and tertiary reflectors 550, 550'. Further in this example, the active illumination device 500 is supported by a ceiling 180 through a support 108. In some implementations, the components of the active illumination device 500 are elongated along the y-axis (perpendicular to the page.)

The solid active illumination device 200 includes multiple LEEs 212, primary optics 220, a light guide 230 and a solid secondary optic 240. The multiple LEEs 212 are operatively disposed on the first surface 510a of the mount, such that the LEEs 212 emit, during operation, light in a first angular range with respect to the normal to the first surface 210a of the mount 210.

The primary optics 220 are arranged on the first surface 210a and coupled with the LEEs 212. The primary optics 220 are shaped to redirect light received from the LEEs 212 in the first angular range, and to provide the redirected light in a second angular range. A divergence of the second angular range is smaller than a divergence of the first angular range at least in the x-z plane. The light guide 230 includes input and output ends. In this case, the input and output ends of the light guide 230 have substantially the same shape. The input end of the light guide 230 is coupled to the primary optics 220 to receive the light provided by the primary optics 220 in the second angular range. Further, the light guide 230 is shaped to guide the light received from the primary optics 220 in the second angular range and to provide the guided light in substantially the same second angular range with respect to the first surface 510a of the mount 510 at the output end of the light guide 230.

The solid secondary optic 240 includes an input end, a redirecting surface 243-c opposing the input end, and first and second output surfaces. The input end of the solid secondary optic 240 is coupled to the output end of the light guide 230 to receive the light provided by the light guide 230 in the second angular range. In this case, the redirecting surface 243-c has been described above in connection with FIG. 2C. The redirecting surface 243-c has first and second portions, and in this case each of the portions of the redirecting surface 243-c has two facets. The first and second portions of the redirecting surface 243-c reflect the light received at the input end of the solid secondary optic 240 in the second angular range, and provide the reflected light in third and fourth angular ranges with respect to the normal to the first surface 510a of the mount 510 towards the first and second output surfaces, respectively. At least prevalent directions of propagation of light in the third and fourth angular ranges are different from each other and from a prevalent direction of propagation of light in the second angular range at least perpendicular to the y-axis.

The first output surface is shaped to refract the light provided by the first portion of the redirecting surface 243-c in the third angular range as first refracted light, and to output the first refracted light in a fifth angular range (142+142a) with respect to the normal to the first surface 510a of the mount 510 outside the first output surface of the solid secondary optic 240. The second output surface is shaped to refract the light provided by the second portion of the redirecting surface 243-c in the fourth angular range as second refracted light, and to output the second refracted light in a sixth angular range (142'+142b) with respect to the normal of the first surface 510a of the mount 510 outside the second output surface of the solid secondary optic 240. Prevalent directions of propagation of light in the fifth (142+142a) and sixth (142'+142b) angular ranges are different from each other. In this example, a relative orientation of facets of the redirecting surface 243-c separates each of the fifth (142+142a) and sixth (142'+142b) angular ranges into portions of extracted light that can be used to form indirect and direct components of an intensity distribution associated with the active illumination device 500. For instance, light extracted from the solid secondary optic 240 in first 142 and second 142' angular sub-ranges of the fifth (142+142a) and sixth (142'+142b) angular ranges is redirected from a steeper facet of the redirecting surface 243-c, and light extracted from the solid secondary optic 240 in third 142a and fourth 142b angular sub-ranges of the fifth (142+142a) and sixth (142'+142b) angular ranges is redirected from a shallower facet of the redirecting surface 243-c.

A first tertiary reflector 550 supported on a second surface of the mount 510, at least in part, faces the first output surface of the solid secondary optic 240. The first tertiary reflector 550 is shaped to reflect at least some of the light output by the first output surface of the solid secondary optic 240 in the third angular sub-range 142a as output light in a seventh angular range 152 with respect to the normal to the first surface 510a of the mount 510. A second tertiary reflector 550' supported on a third surface of the mount 510, at least in part, faces the second output surface of the solid secondary optic 240. The second tertiary reflector 550' is shaped to reflect at least some of the light output by the second output surface of the solid secondary optic 240 in the fourth angular sub-range 142b as output light in an eight angular range 152' with respect to the normal to the first surface 510a of the mount 510. Prevalent directions of propagation of light in the seventh 152 and eight 152' angular ranges are different from each other and have a non-zero component parallel with the normal to the first surface 510a of the mount 510.

In this example, an extent of the first and second tertiary reflectors 550, 550' along the x-axis is configured to allow the light output in first 142 and second 142' angular sub-ranges to pass the first and second tertiary reflectors 550, 550' without being reflected. Prevalent directions of propagation of light in the first 142 and second 142' angular sub-ranges have a non-zero component antiparallel with the normal to the first surface 510a of the mount 510.

In this manner, the active illumination device 500 provides direct illumination (in angular ranges 152, 152') on a target surface located in the positive direction of the z-axis (e.g., on the floor 190) and indirect illumination (in angular ranges 142, 142') towards the ceiling 180.

In other implementations (not illustrated in FIG. 5), the extent of the first and second tertiary reflectors 550, 550' along the x-axis is configured to transmit at least some of the light output by the first output surface of the solid secondary optic 240 in the fifth angular (142+142a) as output light in the seventh angular range 152 with respect to the normal to the first surface 510a of the mount 510, and at least some of the light output by the second output surface of the solid secondary optic 240 in the sixth angular (142'+142b) as output light in the sixth angular range 152 with respect to the normal to the first surface 510a of the mount 510. In this case, the first and second tertiary reflectors 550, 550' may include transparent portions (e.g., portions uncoated with reflecting coating, apertures, slots, etc.) configured to transmit at least some of the light output by the first output surface of the solid secondary optic 240 in the fifth angular range (142+142a) and by the second output surface of the solid secondary optic 240 in the sixth angular range (142'+142b). In this manner, the active illumination device 500 provides direct illumination (as light reflected by the tertiary reflectors 550, 550' in angular ranges 152, 152') on a target surface located in the positive direction of the z-axis (e.g., on the floor 190) and indirect illumination (as light transmitted by the tertiary reflectors 550, 550' in angular ranges (142+142a), (142'+142b)) towards the ceiling 180.

Figure 6:
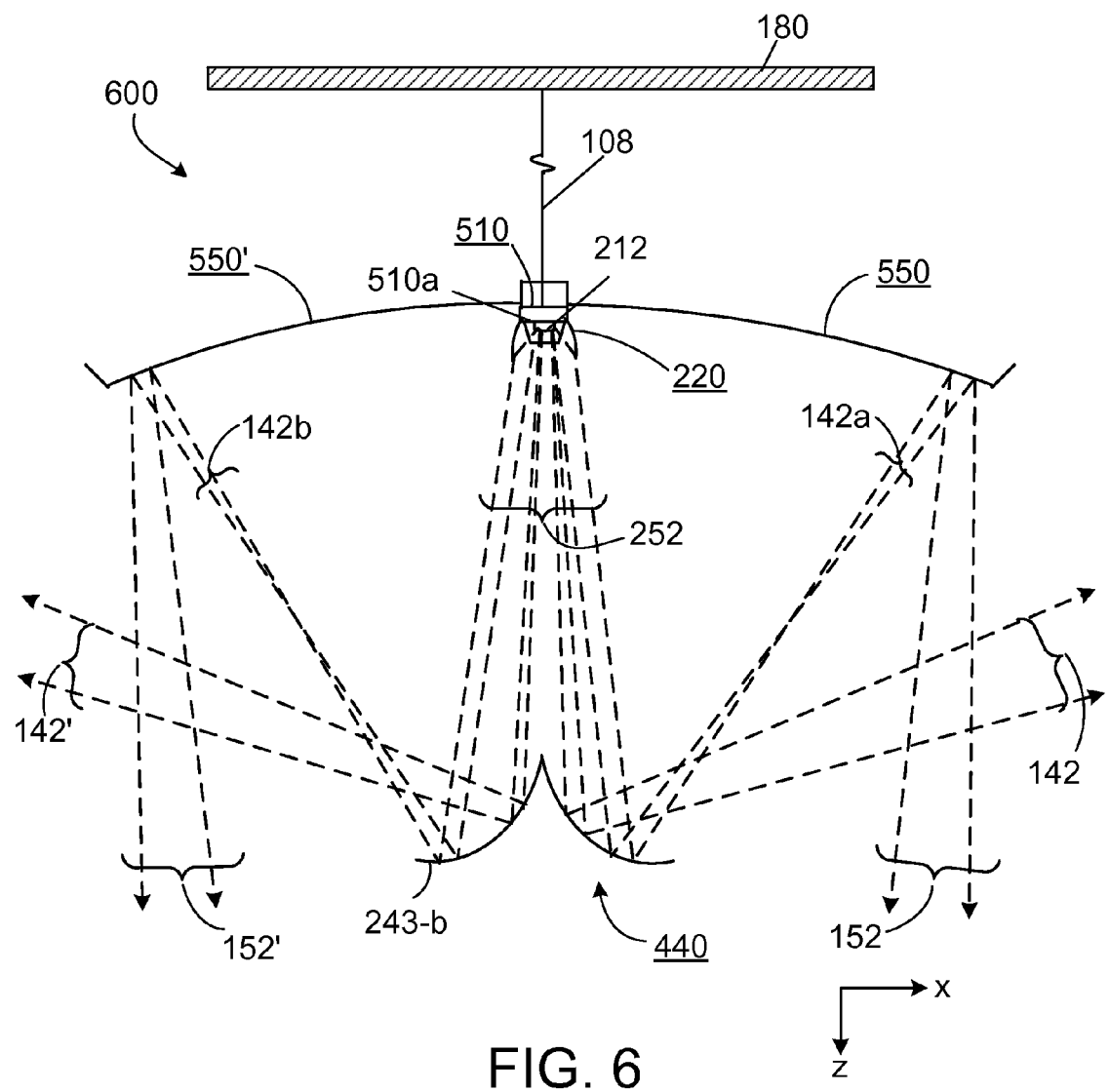
FIG. 6 shows another example of an active illumination device.

FIG. 6 shows another example of an active illumination device 600 to be used in the illumination system 100 of FIG.

1A. In this example, the active illumination device 600 includes a mount 510 that has a first surface 510*a* with a normal parallel to the z-axis. The mount supports a hollow embodiment of the luminaire module (described above in connection with FIGS. 2A and 4), and tertiary reflectors 550, 550'. Further in this example, the active illumination device 600 is supported by a ceiling 180 through a support 108. In some implementations, the components of the active illumination device 600 are elongated along the y-axis (perpendicular to the page.)

The hollow luminaire module includes multiple LEEs 212, primary optics 220 and a secondary optic 440. The multiple LEEs 212 are operatively disposed on the first surface 510*a* of the mount 510, such that the LEEs 212 emit, during operation, light in a first angular range with respect to the normal to the first surface 510*a* of the mount 510.

The primary optics 220 are arranged on the first surface 510*a* and coupled with the LEEs 212. The primary optics 220 are shaped to redirect light received from the LEEs 212 in the first angular range, and to provide the redirected light in a second angular range. A divergence of the second angular range is smaller than a divergence of the first angular range at least in the x-z plane.

The secondary optic 240 includes a redirecting surface 243-*b*. In this case, the redirecting surface 243-*b* has been described above in connection with FIG. 2B. The redirecting surface 243-*b* has first and second portions, each of which has a curvilinear cross-section in the x-z plane. The first and second portions of the redirecting surface 243-*b* reflect the light received from the primary optics 220 in the second angular range, and provide the reflected light in third (142+142*a*) and fourth (142'+142*b*) angular ranges with respect to the normal to the first surface 510*a* of the mount 510, respectively. At least prevalent directions of propagation of light in the third (142+142*a*) and fourth (142'+142*b*) angular ranges are different from each other and from a prevalent direction of propagation of light in the second angular range at least perpendicular to the y-axis. In this example, light reflected by the redirecting surface 243-*b* in first 142 and second 142' angular sub-ranges of the third (142+142*a*) and fourth (142'+142*b*) angular ranges is reflected from a steeper region of the redirecting surface 243-*b*, and light reflected by the redirecting surface 243-*b* in third (142*a*) and fourth 142*b* angular sub-ranges of the third (142+142*a*) and fourth (142'+142*b*) angular ranges is redirected from a shallower region of the redirecting surface 243-*b*.

A first tertiary reflector 550 supported on a second surface of the mount 510, at least in part, faces the first portion of the redirecting surface 243-*b*. The first tertiary reflector 550 is shaped to reflect at least some of the light redirected by the first portion of the redirecting surface 243-*b* in the third angular sub-range 142*a* as output light in a fifth angular range 152 with respect to the normal to the first surface 510*a* of the mount 510. A second tertiary reflector 550' supported on a third surface of the mount 510, at least in part, faces the second portion of the redirecting surface 243-*b*. The second tertiary reflector 550' is shaped to reflect at least some of the light redirected by the second portion of the redirecting surface 243-*b* in the fourth angular sub-range 142*b* as output light in a sixth angular range 152' with respect to the normal to the first surface 510*a* of the mount 510. Prevalent directions of propagation of light in the fifth 152 and sixth 152' angular ranges are different from each other and have a non-zero component parallel with the normal to the first surface 510*a* of the mount 510.

In this example, an extent of the first and second tertiary reflectors 550, 550' along the x-axis is configured to allow the light redirected in first 142 and second 142' angular sub-ranges to pass the first and second tertiary reflectors 550, 550' without being reflected. Prevalent directions of propagation of light in the first 142 and second 142' angular sub-ranges have a non-zero component antiparallel with the normal to the first surface 510*a* of the mount 510.

In this manner, the active illumination device 600 provides direct illumination (in angular ranges 152, 152') on a target surface located in the positive direction of the z-axis (e.g., on the floor 190) and indirect illumination (in angular ranges 142, 142') towards the ceiling 180.

In other implementations (not illustrated in FIG. 6), the extent of the first and second tertiary reflectors 550, 550' along the x-axis is configured to transmit at least some of the light reflected by the first portion of the redirecting surface 243-*b* in the third angular (142+142*a*) as output light in the fifth angular range 152 with respect to the normal to the first surface 510*a* of the mount 510, and at least some of the light reflected by the second portion of the redirecting surface 243-*b* in the fourth angular (142'+142*b*) as output light in the sixth angular range 152 with respect to the normal to the first surface 510*a* of the mount 510. In this case, the first and second tertiary reflectors 550, 550' include transparent portions (e.g., portions uncoated with reflecting coating, or apertures, slots, etc.) configured to transmit at least some of the light reflected by the first portion of the redirecting surface 243-*b* in the third angular range (142+142*a*) and by the second portion of the redirecting surface 243-*b* in the fourth angular range (142'+142*b*). In this manner, the active illumination device 600 provides direct illumination (as light reflected by the tertiary reflectors 550, 550' in angular ranges 152, 152') on a target surface located in the positive direction of the z-axis (e.g., on the floor 190) and indirect illumination (as light transmitted by the tertiary reflectors 550, 550' in angular ranges (142+142*a*), (142'+142*b*)) towards the ceiling 180.

In some implementations, the active illumination devices 150 are configured to allow interdependent as well as independent control of the direct and indirect illuminations by a user, as described in detail below in this specification in connection with FIGS. 7-8.

Figure 7:
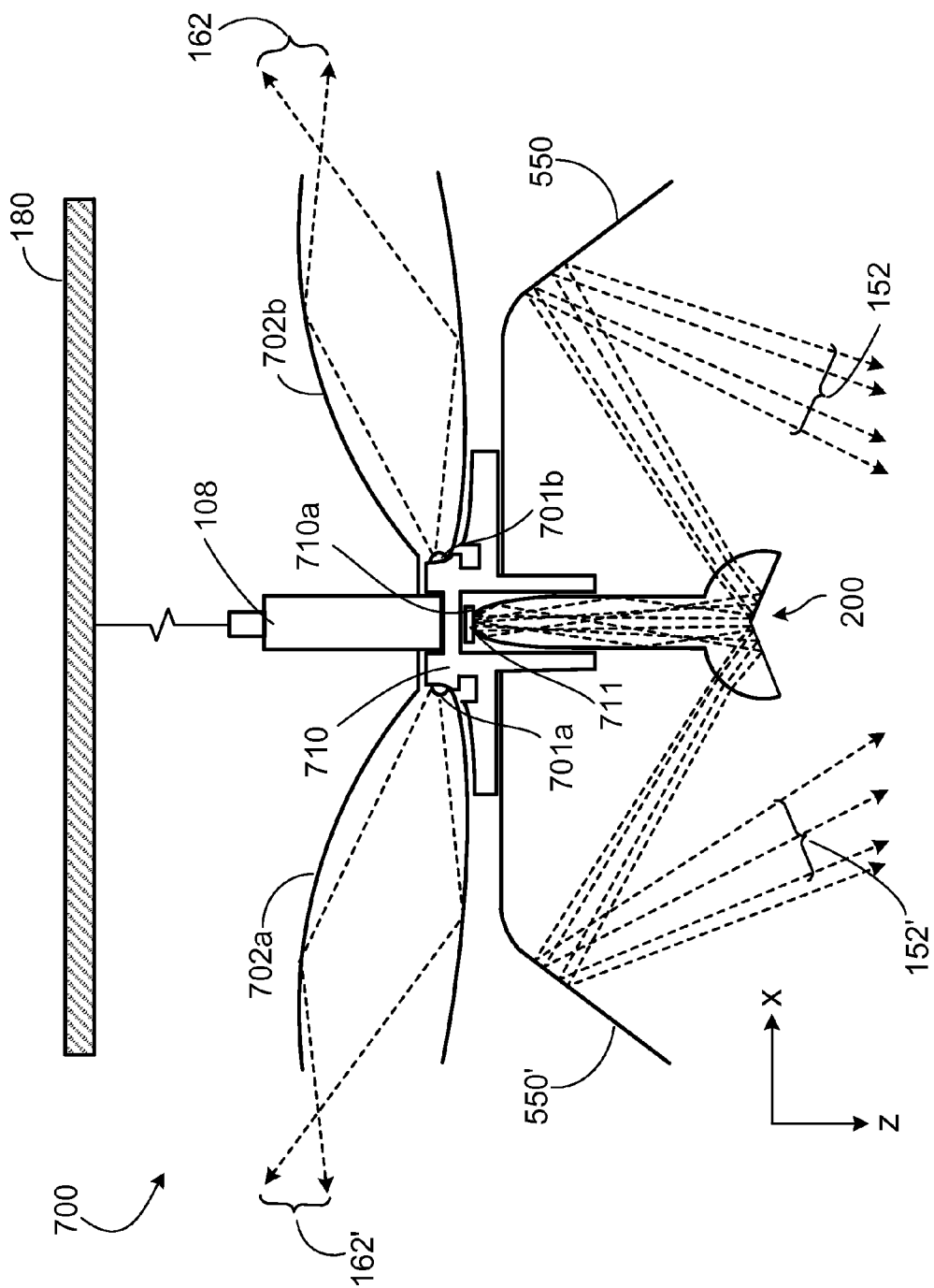
FIG. 7 shows another example of an active illumination device.

FIG. 7, for example, shows an active illumination device 700 to be used in the illumination system 100 of FIG. 1A. In this example, the active illumination device 700 includes a mount 710 that has a first surface 710*a* with a normal parallel to the z-axis. The mount 710 supports a direct optical system and an indirect optical system. The direct optical system includes direct LEEs 711 as part of a solid embodiment of the active illumination device 200 (described above in connection with FIGS. 2A, 3 and 5) and tertiary reflectors 550, 550'. The indirect optical system includes indirect LEEs 701*a*, 701*b* and indirect primary optics 702*a*, 702*b*. Further in this example, the active illumination device 700 is supported by a ceiling 180 through a support 108. In some implementations, the components of the direct and indirect optical system of the active illumination device 700 are elongated along the y-axis (perpendicular to the page.)

The solid active illumination device 200 includes multiple direct LEEs 711, primary direct optics, a light guide and a solid secondary optic. The multiple direct LEEs 711 are operatively disposed on the first surface 710*a* of the mount, such that the direct LEEs emit, during operation, light in a first direct angular range with respect to the normal to the first surface 710*a* of the mount 710.

The direct primary optics are arranged on the first surface 710*a* and coupled with the direct LEEs 711. The direct primary optics are shaped to redirect light received from the direct LEEs 711 in the first direct angular range, and to provide the redirected light in a second direct angular range. A divergence of the second direct angular range is smaller than a divergence of the first direct angular range at least in the x-z plane. The light guide includes input and output ends. In this case, the input and output ends of the light guide have substantially the same shape. The input end of the light guide is coupled to the direct primary optics to receive the light provided by the direct primary optics in the second direct angular range. Further, the light guide is shaped to guide the light received from the direct primary optics in the second direct angular range and to provide the guided light in substantially the same second direct angular range with respect to the first surface 710a of the mount 710 at the output end of the light guide.

The solid secondary optic includes an input end, a redirecting surface opposing the input end, and first and second output surfaces. The input end of the solid secondary optic is coupled to the output end of the light guide to receive the light provided by the light guide in the second direct angular range. The redirecting surface has first and second portions that reflect the light received at the input end of the solid secondary optic in the second direct angular range, and provide the reflected light in third and fourth direct angular ranges with respect to the normal to the first surface 710a of the mount 710 towards the first and second output surfaces, respectively. At least prevalent directions of propagation of light in the third and fourth direct angular ranges are different from each other and from a prevalent direction of propagation of light in the second direct angular range at least perpendicular to the y-axis.

The first output surface is shaped to refract the light provided by the first portion of the redirecting surface in the third direct angular range as first refracted light, and to output the first refracted light in a fifth direct angular range with respect to the normal to the first surface 710a of the mount 710 outside the first output surface of the solid secondary optic. The second output surface is shaped to refract the light provided by the second portion of the redirecting surface in the fourth direct angular range as second refracted light, and to output the second refracted light in a sixth direct angular range with respect to the normal of the first surface 710a of the mount 710 outside the second output surface of the solid secondary optic. Prevalent directions of propagation of light in the fifth and sixth direct angular ranges are different from each other.

A first tertiary reflector 550 supported on a second surface of the mount 710, at least in part, faces the first output surface of the solid secondary optic. The first tertiary reflector 550 is shaped to reflect at least some of the light output by the first output surface of the solid secondary optic in the fifth direct angular range as output light in a seventh direct angular range 152 with respect to the normal to the first surface 710a of the mount 710. A second tertiary reflector 550' supported on a third surface of the mount 710, at least in part, faces the second output surface of the solid secondary optic. The second tertiary reflector 550' is shaped to reflect at least some of the light output by the second output surface of the solid secondary optic in the sixth direct angular range as output light in an eight direct angular range 152' with respect to the normal to the first surface 710a of the mount 710. Prevalent directions of propagation of light in the seventh 152 and eighth 152' direct angular ranges are different from each other and have a non-zero component parallel with the normal to the first surface 710a of the mount 710.

In this example, first indirect LEEs 701a are operatively disposed on a fourth surface of the mount 710. The first indirect LEEs 701a emit, during operation, light in a first indirect angular range with respect to a normal to the first surface 710a. Second indirect LEEs 701b are operatively disposed on a fifth surface of the mount 710, such that the fourth and fifth surfaces are oriented obliquely with respect to each other and to the first surface 710a. The second indirect LEEs 701b emit, during operation, light in a second indirect angular range with respect to a normal to the first surface 710a. At least prevalent directions of propagation of light in the first and second indirect angular ranges are different from each other and from a prevalent direction of propagation of light in the first angular range at least perpendicular to the y-axis.

A first indirect primary optic 702a is arranged on the fourth surface of the mount 710 to couple with the first indirect LEEs 701a. The first indirect primary optic 702a is shaped to redirect light received from the first indirect LEEs 701a in the first indirect angular range, and to provide the redirected light as output light in a third indirect angular range 162' with respect to the normal to the first surface 710a. A divergence of the third indirect angular range 162' is smaller than a divergence of the first indirect angular range at least in a plane perpendicular to the y-axis. A second indirect primary optic 702b is arranged on the fifth surface of the mount 710 to couple with the second indirect LEEs 701b. The second indirect primary optic 702b is shaped to redirect light received from the second indirect LEEs 701b in the second indirect angular range, and to provide the redirected light as output light in a fourth indirect angular range 162 with respect to the normal to the first surface 710a. A divergence of the fourth indirect angular range 162 is smaller than a divergence of the second indirect angular range at least in a plane perpendicular to the longitudinal dimension of the first surface 710a, and prevalent directions of propagation of light in the third 162' and fourth 162 indirect angular ranges are different from each other and have a non-zero component antiparallel with the normal to the first surface 710a of the mount 710.

In this manner, the active illumination device 700 provides direct illumination (in angular ranges 152, 152') on a target surface located in the positive direction of the z-axis (e.g., on the floor 190) and indirect illumination (in angular ranges 162, 162') towards the ceiling 180.

Figure 8:
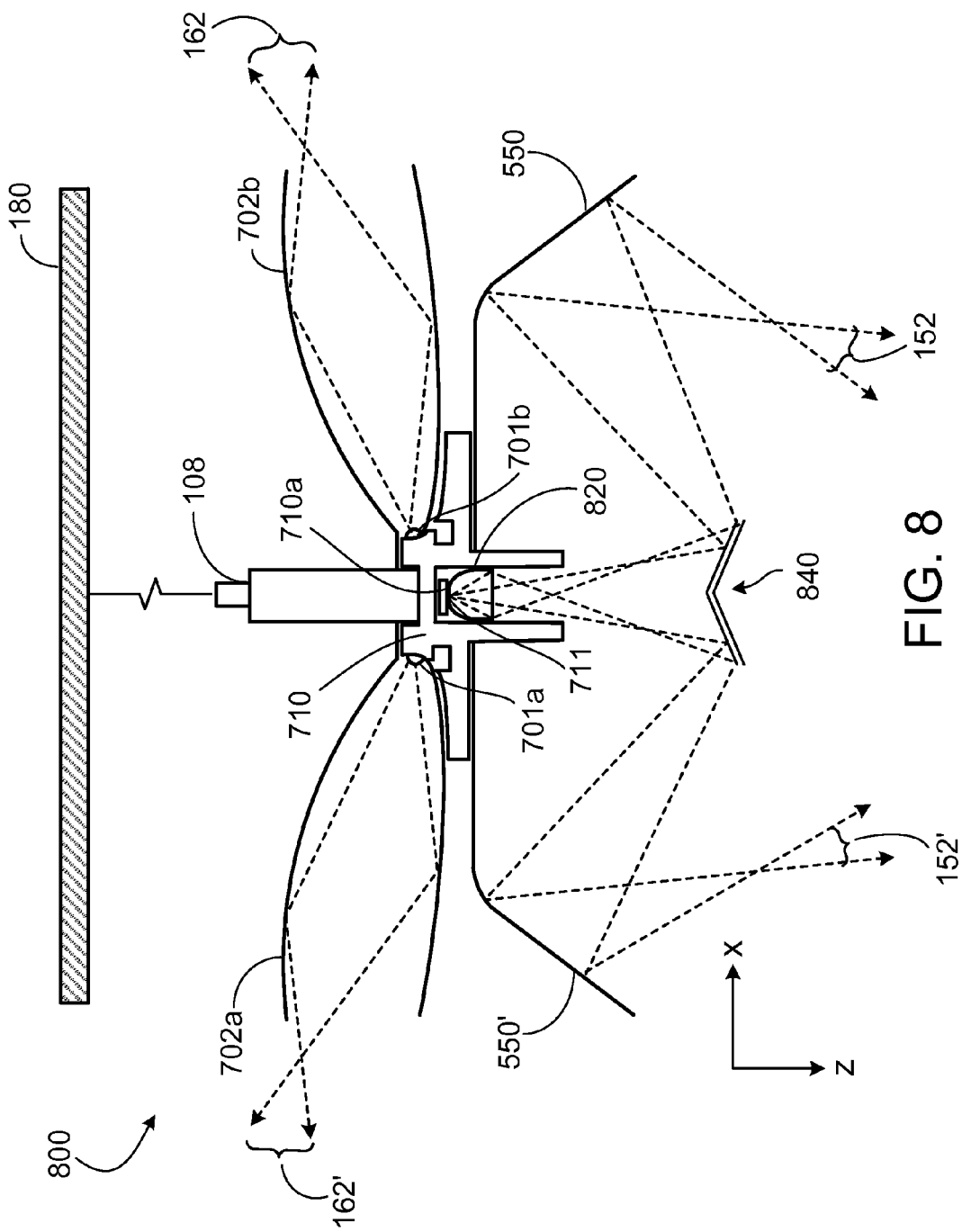
FIG. 8 shows another example of an active illumination device.

FIG. 8 shows a further example of an active illumination device 800 to be used in the illumination system 100 of FIG. 1A. In this example, the active illumination device 800 includes a mount 710 that has a first surface 710a with a normal parallel to the z-axis. The mount 710 supports a direct optical system and an indirect optical system. The direct optical system includes direct LEEs 711 as part of a hollow embodiment of the luminaire module (described above in connection with FIGS. 2A, 4 and 6) and tertiary reflectors 550, 550'. The indirect optical system includes indirect LEEs 701a, 701b and indirect primary optics 702a, 702b. Further in this example, the active illumination device 800 is supported by a ceiling 180 through a support 108. In some implementations, the components of the direct and indirect optical system of the active illumination device 800 are elongated along the y-axis (perpendicular to the page.)

The hollow luminaire module includes multiple direct LEEs, primary direct optics 820 and a secondary optic 840. The multiple direct LEEs are operatively disposed on the first surface 710a of the mount, such that the direct LEEs emit, during operation, light in a first direct angular range with respect to the normal to the first surface 710a of the mount 710.

The direct primary optics 820 are arranged on the first surface 710a and coupled with the direct LEEs 711. The direct primary optics 820 are shaped to redirect light received from the direct LEEs 711 in the first direct angular range, and to provide the redirected light in a second direct angular range. A divergence of the second direct angular range is smaller than a divergence of the first direct angular range at least in the x-z plane.

The secondary optic 840 includes a redirecting surface. The redirecting surface has first and second portions that reflect the light received from the direct primary optic 220 in the second direct angular range, and provide the reflected light in third and fourth direct angular ranges with respect to the normal to the first surface 710a of the mount 710, respectively. At least prevalent directions of propagation of light in the third and fourth direct angular ranges are different from each other and from a prevalent direction of propagation of light in the second direct angular range at least perpendicular to the y-axis.

A first tertiary reflector 550 supported on a second surface of the mount 710, at least in part, faces the first portion of the redirecting surface of the secondary optic 840. The first tertiary reflector 550 is shaped to reflect at least some of the light redirected by the first portion of the redirecting surface in the third direct angular range as output light in a fifth direct angular range 152 with respect to the normal to the first surface 710a of the mount 710. A second tertiary reflector 550' supported on a third surface of the mount 710, at least in part, faces the second portion of the redirecting surface. The second tertiary reflector 550' is shaped to reflect at least some of the light redirected by the second portion of the redirecting surface in the fourth direct angular range as output light in a sixth direct angular range 152' with respect to the normal to the first surface 710a of the mount 710. Prevalent directions of propagation of light in the fifth 152 and sixth 152' direct angular ranges are different from each other and have a non-zero component parallel with the normal to the first surface 710a of the mount 710.

In this example, first indirect LEEs 701a are operatively disposed on a fourth surface of the mount 710. The first indirect LEEs 701a emit, during operation, light in a first indirect angular range with respect to a normal to the first surface 710a. Second indirect LEEs 701b are operatively disposed on a fifth surface of the mount 710, such that the fourth and fifth surfaces are oriented obliquely with respect to each other and to the first surface 710a. The second indirect LEEs 701b emit, during operation, light in a second indirect angular range with respect to a normal to the first surface 710a. At least prevalent directions of propagation of light in the first and second indirect angular ranges are different from each other and from a prevalent direction of propagation of light in the first angular range at least perpendicular to the y-axis.

A first indirect primary optic 702a is arranged on the fourth surface of the mount 710 to couple with the first indirect LEEs 701a. The first indirect primary optic 702a is shaped to redirect light received from the first indirect LEEs 701a in the first indirect angular range, and to provide the redirected light as output light in a third indirect angular range 162' with respect to the normal to the first surface 710a. A divergence of the third indirect angular range 162' is smaller than a divergence of the first indirect angular range at least in a plane perpendicular to the y-axis. A second indirect primary optic 702b is arranged on the fifth surface of the mount 710 to couple with the second indirect LEEs 701b. The second indirect primary optic 702b is shaped to redirect light received from the second indirect LEEs 701b in the second indirect angular range, and to provide the redirected light as output light in a fourth indirect angular range 162 with respect to the normal to the first surface 710a. A divergence of the fourth indirect angular range 162 is smaller than a divergence of the second indirect angular range at least in a plane perpendicular to the longitudinal dimension of the first surface 710a, and prevalent directions of propagation of light in the third 162' and fourth 162 indirect angular ranges are different from each other and have a non-zero component antiparallel with the normal to the first surface 710a of the mount 710.

In this manner, the active illumination device 700 provides direct illumination (in angular ranges 152, 152') on a target surface located in the positive direction of the z-axis (e.g., on the floor 190) and indirect illumination (in angular ranges 162, 162') towards the ceiling 180.

(iii) Passive Illumination Devices

In general, a variety of passive illumination devices can be used in the illumination system 100 to provide desired illumination. The size, shape, and composition of the passive illumination device depends on the nature of the light the device receives from adjacent active illumination devices and on the desired distribution of light the device provides to the target area. For example, the size of the passive illumination device depends on the spatial extent of the light from the active illumination devices. Generally, the greater the spatial extent of the light, the larger the passive illumination device will be. Furthermore, the optical properties of the passive illumination device are selected to provide light having the desired distribution at the target area from the light received from the active illumination devices.

Figure 9:
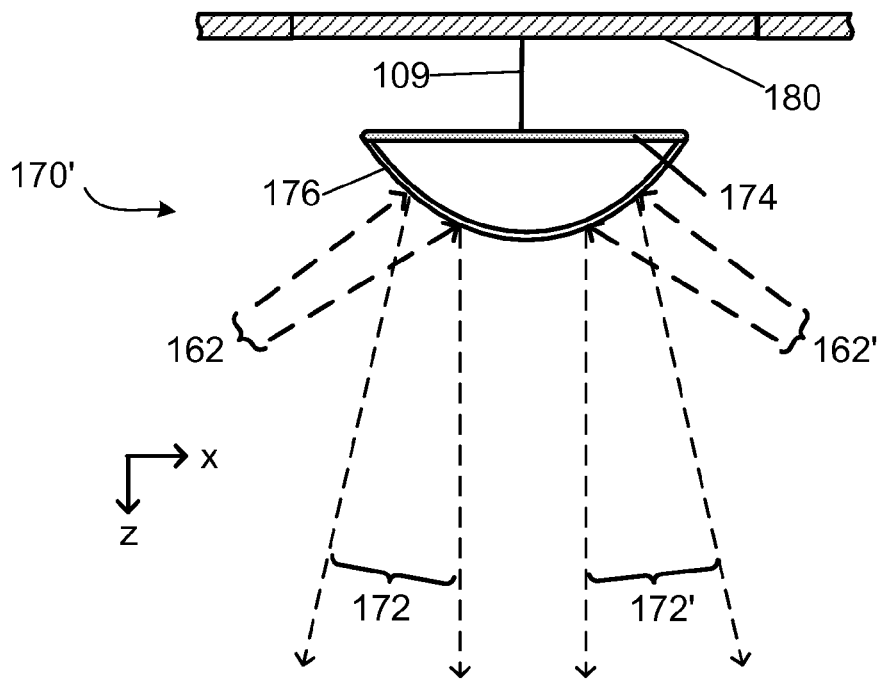
FIG. 9 shows an example of a passive illumination device.

FIG. 9 shows an example of a passive illumination device 170' that includes a mount 174 (e.g., a rigid support) and a redirecting optic 176 attached to the mount. In this example, the redirecting optic 176 is a convex reflector shaped to redirect, towards the target area, the indirect illumination received in the indirect angular ranges 162, 162'. The redirected light propagates to the target area in direct angular ranges 172, 172'. In this manner, the passive illumination device 170' provides direct illumination of the target area. Convex redirecting optic 176 has the effect of introducing additional divergence into the reflected light. The radius of curvature of the reflector may vary in order to provide a desired amount of divergence into the redirected light. Other shapes are also possible. For example, the reflector may be an aspherical reflector. In some embodiments, the reflector can be planar or concave. A planar reflector may serve to simply change the direction of propagation of incidence light while a concave reflector may decrease the divergence of reflected light or collimate or focus light. Moreover, the redirecting optic 176 can be a reflector having a continuous surface or a faceted surface. In some implementations, the passive illumination device 170' is elongated along the y-axis. For example, the passive illumination device 170' may extend along the y-axis the same amount as active illumination device 150.

In this example, the passive illumination device 170 is attached to the ceiling 180 through a support 109. The support 109 can include wires or rods, for example, or combinations thereof. The support 109 suspends the passive illumination device 170' a desired amount from the ceiling. In some implementations, however, the passive illumination device can be attached directly to the ceiling.

Figure 10:
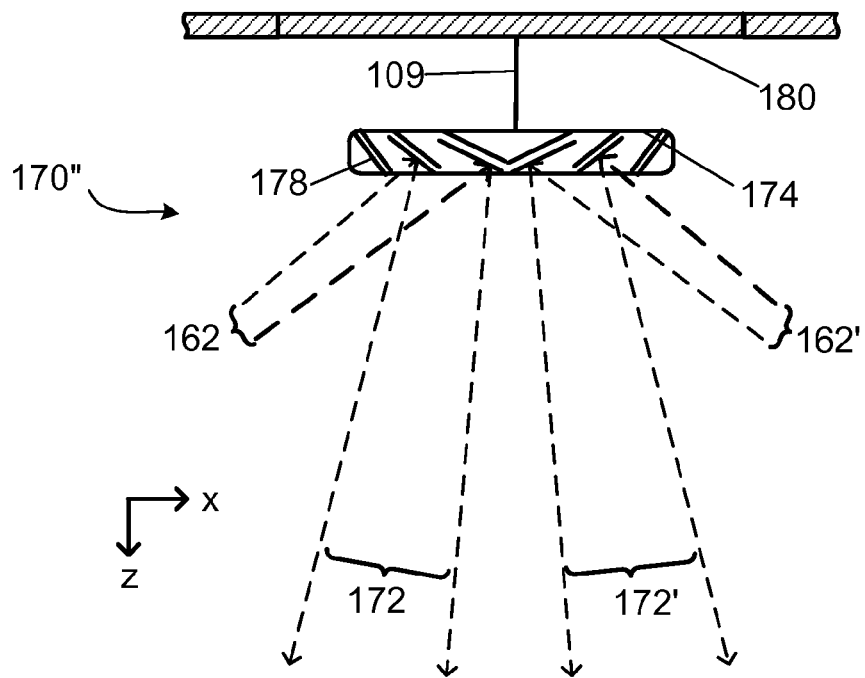
FIG. 10 shows another example of a passive illumination device.

FIG. 10 shows another example of a passive illumination device 170" that can be used in the illumination system 100. The passive illumination device 170" includes mount 174 and a redirecting optic 178 attached to the mount. In this example, the redirecting optic 178 is a Fresnel reflector shaped to redirect, towards the target area, the indirect illumination received in the indirect angular ranges 162, 162', as redirected light in direct angular ranges 172, 172'. In this manner, the passive illumination device 170" provides direct illumination of the target area (in the form of redirected light in the direct angular ranges 172, 172').

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, so long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination system comprising:
multiple active illumination devices spaced apart from each other in a horizontal direction and from a target surface in a vertical direction, each of the active illumination devices comprising one or more light emitting elements (LEEs) and first redirecting optics; and one or more passive illumination devices distributed between and in optical communication with the active illumination devices, the one or more passive illumination devices and the active illumination devices being spaced apart from one another in the horizontal direction, such that none of the respective adjacent active and passive illumination devices overlap one another in the vertical direction, each of the passive illumination devices comprising one or more second redirecting optics
wherein, for each of the active illumination devices, the first redirecting optics are arranged and configured to redirect light emitted by the one or more LEEs in a first angular range as (i) first direct light in a second angular range and (ii) indirect light in a third angular range, such that a prevalent direction of the first direct light in the second angular range is towards an associated direct portion of the target surface, and a prevalent direction of the indirect light in the third angular range is directed towards one or more of the passive illumination devices, and
wherein, for each of the one or more passive illumination devices, the second redirecting optics are arranged and configured to redirect the indirect light received from one or more of the active illumination devices in one or more of the third angular ranges, and to provide the redirected light as second direct light in one or more fourth angular ranges, such that a prevalent direction of the second direct light in the one or more fourth angular ranges is towards one or more associated indirect portions of the target surface.

2. The illumination system of claim 1, wherein the active illumination devices and the one or more passive illumination devices are spaced apart from one another and from the target surface such that corresponding first and second direct light combine in a desired illuminance of the target surface.

3. The illumination system of claim 1, wherein divergences of the second and third angular ranges are smaller than a divergence of the first angular range.

4. An illumination system, comprising:
at least one active illumination device, each active illumination device comprising at least one light emitting element and an optical element arranged to receive light from the at least one light emitting element and to direct illumination from the at least one light emitting element in at least two discrete angular ranges in a cross-sectional plane, and a support for attaching the active illumination device to a ceiling; and
at least one passive illumination device, each passive illumination device comprising a reflector and a support for attaching the passive illumination device to the ceiling,
wherein both the active and passive illumination devices are attached to the ceiling and spaced apart a pre-established distance from each other in a horizontal direction such that none of the respective adjacent active and passive illumination devices overlap one another in a vertical direction, and wherein the reflector is configured so the reflector receives light directed by the optical element into one of the discrete angular ranges and directs the received light toward a target surface in the vertical direction.

5. The illumination system of claim 4 wherein the corresponding supports of the at least one active illumination device and at least one passive illumination device are configured to position the optical element of the at least one active illumination device at a height further from the ceiling than the reflector of the at least one passive illumination device.

6. The illumination system of claim 5 wherein the support of the at least one passive illumination device positions the reflector of the passive illumination device at substantially the same height as the ceiling.

7. The illumination system of claim 5 wherein the support of the at least one passive illumination device positions the reflector of the passive illumination device at a height below the ceiling.

8. The illumination system of claim 4 wherein light propagating in two of the at least two discrete angular ranges propagates towards the ceiling.

9. The illumination system of claim 4 wherein both the active and passive illumination devices direct light towards the target surface.

10. The illumination system of claim 9 wherein light from the at least one active illumination device and an adjacent one of the passive illumination devices overlap on the target surface.

11. The illumination system of claim 4 wherein light from the illumination system incident on the target surface does not exceed a glancing angle of 40° with respect to an axis perpendicular to the ceiling.

12. The illumination system of claim 4 wherein the at least one illumination device is elongated in a direction perpendicular to the cross-sectional plane.

13. The illumination system of claim 4 wherein the at least one active illumination device has a plane of symmetry orthogonal to the cross-sectional plane.

14. The illumination system of claim 4 wherein the at least one active illumination device comprises a light guide configured to guide light from the at least one light emitting device to the optical element.

15. The illumination system of claim 4 wherein the optical element of the at least one active illumination device comprises an interface configured to reflect at least some of the light from the at least one light emitting device into two of the discrete angular ranges.

16. The illumination system of claim 15 wherein the interface is configured to transmit at least some of the light from the at least one light emitting element into at least one of the discrete angular ranges.

17. The illumination system of claim 4 wherein the at least one active illumination device comprises a reflector positioned to reflect light from the optical element.

18. The illumination system of claim 4 wherein the at least one light emitting element is a light emitting diode.

19. The illumination system of claim 4 wherein the reflector of the at least one passive illumination device is a curved reflector.

20. The illumination system of claim 19 wherein the curved reflector is a convex reflector.

21. The illumination system of claim 4 wherein the reflector of the at least one passive illumination element is a Fresnel reflector.

22. The illumination system of claim 4 wherein the reflector of the passive illumination device receives light from two active illumination devices on opposing sides of the passive illumination device.

23. The illumination system of claim 4 wherein the at least one active illumination device is configured to direct light to passive illumination devices on opposing sides of the active illumination device.

* * * * *

UNITED STATES PATENT AND TRADEMARK OFFICE
CERTIFICATE OF CORRECTION

| | | |
|---|---|---|
| PATENT NO. | : 9,733,414 B2 | Page 1 of 1 |
| APPLICATION NO. | : 14/766644 | |
| DATED | : August 15, 2017 | |
| INVENTOR(S) | : Hans Peter Stormberg et al. | |

It is certified that error appears in the above-identified patent and that said Letters Patent is hereby corrected as shown below:

In the Claims

Column 25, Line 48, in Claim 1, delete "optics" and insert -- optics, -- therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*